US007002970B1

(12) United States Patent
Veschi

(10) Patent No.: US 7,002,970 B1
(45) Date of Patent: Feb. 21, 2006

(54) PRIVATE DIALING PLAN FOR VOICE ON A PACKET-BASED NETWORK

(75) Inventor: Robert A. Veschi, Germantown, MD (US)

(73) Assignee: Edge Access, Inc., St. Thomas (VG)

( * ) Notice: Subject to any disclaimer, the term of this patent is extended or adjusted under 35 U.S.C. 154(b) by 0 days.

(21) Appl. No.: 09/574,820

(22) Filed: May 19, 2000

Related U.S. Application Data

(60) Provisional application No. 60/152,045, filed on Sep. 2, 1999, provisional application No. 60/134,871, filed on May 19, 1999.

(51) Int. Cl.
H04L 12/28 (2006.01)
(52) U.S. Cl. ...................................... 370/401; 709/225
(58) Field of Classification Search ................ 370/352, 370/401, 389–396, 335; 401/389–395; 249/341, 249/441–444, 320, 335, 350; 379/114.15, 379/90.01, 265.11, 93.09, 67.1, 114.02, 201.01, 379/207.01, 114.01, 120; 375/140, 367; 709/225, 229
See application file for complete search history.

(56) References Cited

U.S. PATENT DOCUMENTS 5,862,203 A * 1/1999 Wulkan et al. ........ 379/114.02
6,128,291 A * 10/2000 Perlman et al. ............. 370/352
6,154,533 A * 11/2000 Foelker .................. 379/201.01
6,167,056 A * 12/2000 Miller et al. ................ 370/441
6,226,287 B1 * 5/2001 Brady ......................... 370/352
6,335,927 B1 * 1/2002 Elliott et al. ................ 370/352
6,381,644 B1 * 4/2002 Munguia et al. ............ 709/225
6,466,548 B1 * 10/2002 Fitzgerald ................... 370/249
6,539,077 B1 * 3/2003 Ranalli et al. ............. 379/67.1
6,614,781 B1 * 9/2003 Elliott et al. ................ 370/352

* cited by examiner

Primary Examiner—Chi Pham
Assistant Examiner—Prenell Jones
(74) Attorney, Agent, or Firm—Davidson Berquist Jackson & Gowdey, LLP

(57) ABSTRACT

A private dialing plan for the communication of packetized voice on a packet-based network using a signaling protocol such as Q.931 to establish, maintain and release switched connections over the network. The dialing plan uses a "telephone number" based on a conventional 10-digit telephone number, such as the user's regular telephone number. A leading single digit consisting of a "0" or a "1" is added in front of the conventional telephone number. A leading "0" indicates that the desired call is to be directed to the called party's on-network computer by means of the Internet, while a leading "1" indicates the call is directed through a special gateway to the called party's conventional telephone.

13 Claims, 33 Drawing Sheets

| Message Elements | | | | Bytes | Value | Description |
|---|---|---|---|---|---|---|
| Gatekeeper Message Format | | | | | | |
| | Ethernet Header | | | | | |
| | | Destination MAC Address | | 6 | | |
| | | Source MAC Address | | 6 | | |
| | | Type | | 2 | | |
| | IP Header | | | | | |
| | | Version/Head Len | | 1 | | |
| | | Service Type | | 1 | | |
| | | Total Length | | 2 | | |
| | | Identification | | 2 | | |
| | | Flags/Fragmentation Offset | | 2 | | |
| | | TTL | | 1 | | |
| | | Protocol | | 1 | | |
| | | Checksum | | 2 | | |
| | | Source Address | | 4 | | |
| | | Destination Address | | 4 | | |
| | UDP Header | | | | | |
| | | Source Port | | 2 | | |
| | | Destination Port | | 2 | | |
| | | Total Length | | 2 | | |
| | | Checksum | | 2 | | |
| | Other | | | | | |
| | | CRC-8 | | 1 | | |
| | | Chan ID High | | 1 | | |
| | | Chan ID Low | | 1 | | |
| | | Protocol Discrim | | 1 | | |
| | | Call Reference | | 3 | | |
| | | Message Type | | 1 | 0x70 | ZeroPlus Message Type |
| | | ZeroPlus Message Type | | 1 | | Define for ZeroPlus Message |
| | | Specific IE ID | | 1 | | Specific IEs |

FIG. 4 - Gatekeeper Message Format

| Message Elements | Bytes | Value | Description |
|---|---|---|---|
| Gatekeeper Request Message 0x38 Information Elements | | | |
| Request Sequence Number | | | |
|    Req Seq Number | 1 | 0x65 | ID of Request Sequence Number Information Element |
|    Request Sequence Number | 2 | | A monotonically increasing number unique to the sender. It shall be returned to the receiver in any message associated with this specific message |
|    UIDPIN | 1 | | ID of UIDPIN Information Element |
|    Length (L) | 1 | L1 | Length of UIDPIN |
|    UID | L1 | | ACSII UIDPIN |
|    Client Version | 1 | 0x72 | ID of Client Version Information Element |
|    Length | 1 | L2 | Number of bytes in Client Version IE (8 bytes) |
|    Client Version | L2 | | Client Version consists of 4 integers: MAJOR, MINOR, BUG_FIX, PATCH |

FIG. 5 - Gatekeeper Request Message Information Elements

| Message Elements | Bytes | Value | Description |
|---|---|---|---|
| Gatekeeper Confirm Message 0x39 Information Elements (Section 1) | | | |
| Req Seq No. | 1 | 0x65 | ID of requested sequence Number Information Element |
| Request Sequence Number | 2 | | This is a monotonically increasing number unique to the sender. It shall be returned by the receiver in any message associated with the specific message. |
| Station Type | 1 | 0x2F | ID of Station Type Information Element |
| Station Type | 1 | 0x00 | Station_Telset |
| | | 0x01 | Station_CO |
| | | 0x05 | Groundstart |
| | | 0x06 | Loopstart |
| | | 0x07 | Wink_start |
| | | 0x08 | Wink_Start_With_FGBD |
| | | 0x09 | Delay_Dial |
| | | 0x0A | Immediate_Start |
| | | 0x0B | Fixed_Pause |
| | | 0x0C | ISDN_BRI_MVIP |
| | | 0x0E | ISDN_PRI |
| Country Code* | 1 | 0x55 | ID of country Code Information Element RAS_CC |
| CC Length* | 1 | L1 | Length of Country Code |
| Country Code* | L1 | | ASCI Country Code |
| City Code* | 1 | | ID of City Code Information Element RAS_City_Code |
| City Code Length* | 1 | L2 | Length of City Code |
| City Code* | L2 | | ASCII City Code |
| COC* | 1 | 0x57 | ID of COC Inforamtion Element RAS_COC |
| COC Length* | 1 | L3 | Length of COC |
| Central Office Code* | L3 | | ASCII COC |
| XXXX* | 1 | 0x58 | ID of XXXX Information Element RAS_XXXX |
| XXXX Length* | 1 | L4 | Length of XXXX |
| Extension* | L4 | | ASCII XXXX |

\* For End Station Only

FIG. 6a - Gatekeeper Confirmation Message Information Elements

| Message Elements | | Bytes | Value | Description |
|---|---|---|---|---|
| Gatekeeper Confirm Message 0x39 Information Elements (Section 2) | | | | |
| | Rec_ID | 1 | 0x5D | ID of Rec_ID Information Element |
| | Length | 1 | L1 | Length of Rec_ID |
| | Record ID | L1 | | Record ID of CDR |
| | Feature Info | 1 | 0x7b | ID of Feature Info Information Element |
| | Length | 1 | | Number of Bytes in Feature Info IE |
| | Feature Status 0 | 1 | | Bit 7 - Forward on Busy and No Answer |
| | | | | Bit 6 - Forward on No Answer |
| | | | | Bit 5 - Forward on Busy |
| | | | | Bit 4 - Forward Unconditional |
| | | | | Bit 3 - Call Waiting |
| | | | | Bit 2 - Transfer |
| | | | | Bit 1 - Call Blocking for Outgoing Calls |
| | | | | Bit 0 - Call Blocking for Incomming Calls |
| | Feature Status 1 | 1 | | For future Use |
| | Feature Status 2 | 1 | | For future Use |
| | Feature Status 3 | 1 | | For future Use |
| | Feature Allowed 0 | 1 | | Bit 7 - Forward on Busy and No Answer |
| | | | | Bit 6 - Forward on No Answer |
| | | | | Bit 5 - Forward on Busy |
| | | | | Bit 4 - Forward Unconditional |
| | | | | Bit 3 - Call Waiting |
| | | | | Bit 2 - Transfer |
| | | | | Bit 1 - Call Blocking for Outgoing Calls |
| | | | | Bit 0 - Call Blocking for Incomming Calls |
| | Feature Allowed 1 | 1 | | For future Use |
| | Feature Allowed 2 | 1 | | For future Use |
| | Feature Allowed 3 | 1 | | For future Use |

FIG. 6b - Gatekeeper Confirmation Message Information Elements

| Message Elements | | Bytes | Value | Description |
|---|---|---|---|---|
| Gatekeeper Reject Message 0x3A Information Elements | | | | |
| | Req Seq No | 1 | 0x65 | ID of Request Sequence Number Information Element |
| | Request Sequence No. | 2 | | This is a monotonically increasing number unique to the sender. It shall be returned by the receiver in any message associated with this specific message. |
| | Cause | 1 | 0x0E | ID of Cause Information Element |
| | Cause Code | 1 | 0x01 | Success |
| | | | 0x02 | Already Being Configured |
| | | | 0x03 | Not in Host List |
| | | | 0x08 | Validation Failed |

FIG. 7 - Gatekeeper Rejection Message Information Elements

| Message Elements | | Bytes | Value | Description |
|---|---|---|---|---|
| Admission Request Message 0X3E Information Elements | | | | |
| | Req Seq No | 1 | 0x65 | ID of Request Sequence Number Information Element |
| | Request Sequence No. | 2 | | This is a monotonically increasing number unique to the sender. It shall be returned by the receiver in any message associated with this specific message. |
| | UIDPIN | 1 | 0x6B | ID of UIDPIN information Element |
| | Length (L) | 1 | | Length of UIDPIN |
| | UIDPIN | L | | ASCII UIDPIN |
| | Calling Party | 1 | 0x13 | ID of Calling Party Information Element |
| | Length (L) | 1 | L1 | Length of Calling Party Number |
| | Calling Party Number | L1 | | ASCII Calling Party Number |
| | Called Party | 1 | 0x42 | ID of Called Party Information Element |
| | Length (L) | 1 | L2 | Length of Called Party Number |
| | Calling Party Number | L2 | | ASCII Called Party Number |

FIG. 8 - Admission Request Message 0x3E Information Elements

| Message Elements | | Bytes | Value | Description |
|---|---|---|---|---|
| Admission Confirmation Message 0x3F Information Elements (Section 1) | | | | |
| | Req Seq No | 1 | 0x65 | ID of Request Sequence Number Information Element |
| | Request Sequence No. | 2 | | This is a monotonically increasing number unique to the sender. It shall be returned by the receiver in any messages associated with this specific message. |
| | Auth Code | 1 | 0x45 | ID of Authorization Code Information Element |
| | Next Authorization Code | 4 | | Authorization Code to use for the next call |
| | Max Duration | 1 | 0x5A | ID of Max Duration Information Element |
| | Duration | 4 | | Max Duration of call in seconds |
| | Orig UID | 1 | 0x46 | ID of UID Information Element |
| | Length (L) | 1 | L1 | Length of UID |
| | Originating UID | L1 | | ASCII Originating UID |
| | ORIG E164 | 1 | 0x69 | ID of OrigE164 Information Element |
| | Length (L) | 1 | L2 | Length of Originating E164 Number |
| | Originating E164 Number | L2 | | ASCII Originating E164 Number |
| | TERMS | 1 | 0x70 | ID of TermE164 Information Element |
| | Length (L) | 1 | L3 | Length of Terminating E 164 Number |
| | Terminating E164 Number | L3 | | ASCII Terminating E164 Number |

FIG. 9a - Admission Confirm Message 0x3F Information Elements

| Message Elements | | Bytes | Value | Description |
|---|---|---|---|---|
| Admission Confirmation Message 0x3F Information Elements (Section 2) | | | | |
| | Acct Type | 1 | 0x5C | ID of Account Type Information Element |
| | Accounty Type | 2 | 0x01 | Credit Account |
| | | | 0x02 | Debit Card |
| | | | 0x03 | Limited Credit Account |
| | Rec_id | 1 | 0x5D | ID of Rec_id Information Element |
| | Length (L) | 1 | L1 | Length of Rec_id |
| | Record ID | L1 | | Record ID of CDR |
| | Call Rate | 1 | 0x6D | ID of Call Rate Information Element |
| | Rate | 4 | | Rate in Host Byte Order |
| | IP_UID Tuple | 1 | 0x5B | ID of IP_UID Tuple Information Element |
| | No. Tuples | 1 | | Number of tuples in this message |
| | Host IP Address 1 | 4 | | IP Address of Host |
| | Term UID Length (L) | 1 | L2 | Length of Terminating UID |
| | Term UID1 | L2 | | ASCII Terminating UID |
| | BillingUID Length (L) | 1 | L3 | Length of Billing UID |
| | Billing UID | L3 | | ASCII Billing UID |
| | Outpulse No. Len | 1 | | Length of Outpulse No. |
| | Outpulse No. | 4 | | ASCII Outpulse No. |
| | Station Type | 1 | 0x00 | STATION_TELSET |
| | | | 0x01 | STATION_CO |
| | | | 0X05 | GROUNDSTART |
| | | | 0X06 | LOOPSTART |
| | | | 0X07 | WINKSTART |
| | | | 0X08 | WINK_START_WITH_FGBD |
| | | | 0X09 | DELAY_DIAL |
| | | | 0X0A | IMMEDIATE_START |
| | | | 0X0B | FIXED_PAUSE |
| | | | 0X0C | ISDN_BRI_MVIP |
| | | | 0X0E | ISDN_PRI |

FIG. 9b - Admission Confirm Message 0x3F Information Elements

| Message Elements | | Bytes | Value | Description |
|---|---|---|---|---|
| Admission Reject Message 0x40 Information Element | | | | |
| | Req Seq No | 1 | 0x65 | ID of Request Sequence Number Information Element |
| | Request Sequence Number | 2 | | This is a monotonically increasing number unique to the sender. It shall be returned by the receiver in any messages associated with this specific message. |
| | Cause | 1 | 0x0E | ID of Cause Information Element |
| | Cause Code | 1 | 0x01 | Success |
| | | | 0x02 | Already Being Configured |
| | | | 0x03 | Not in Host List |
| | | | 0x08 | Validation Failed |
| | | | 0x09 | Could not translate number |
| | | | 0x0A | Permission Denied |

FIG. 10 - Admission Reject Message 0x40 Information Element

| Message Elements | | Bytes | Value | Description |
|---|---|---|---|---|
| Authorization Request Message 0x41 Information Elements | | | | |
| | Req Seq No | 1 | 0x65 | ID of Request Sequence Number Information Element |
| | Request Sequence Number | 2 | | This is a monotonically increasing number unique to the sender. It shall be returned by the receiver in any messages associated with this specific message. |
| | Orig UID | 1 | 0x46 | ID of UID Information Element |
| | Length (L) | 1 | L1 | Length of UID |
| | Originating UID | L1 | | ASCII Originating UID |
| | Auth Code | 1 | 0x45 | ID of Authorization Code Information Element |
| | Authorization Code | 4 | | Authorization Code |
| | Term UID | 1 | 0x62 | ID of Terminating UID Information Element |
| | Length (L) | 1 | L2 | Length of Terminating UID |
| | Terminating UID | L2 | | ASCII Terminating UID |
| | Orig GW IP Addr | 1 | 0x73 | ID of Originating Gateway IP Address Information Element |
| | Length (L) | 1 | L3 | Length of Originating Gateway IP Address |
| | Originating Gateway IP Address | L3 | | Originating Gateway IP Address |
| | Term GW IP Addr | 1 | 0x73 | ID of Terminating Gateway IP Address Information Element |
| | Length (L) | 1 | L4 | Length of Terminating Gateway IP Address |
| | Terminating Gateway IP Address | L4 | | Terminating Gateway IP Address |

FIG. 11 - Authorization Request Message 0x41 Information Elements

| Message Elements | | Bytes | Value | Description |
|---|---|---|---|---|
| Authorization Confirm Message 0x42 Information Elements | | | | |
| | Req Seq No | 1 | 0x65 | ID of Request Sequence Number Information Element |
| | Request Sequence Number | 2 | | This is a monotonically increasing number unique to the sender. It shall be returned by the receiver in any messages associated with this specific message. |
| | Acct Type | 1 | 0x5C | ID of Account Type Information Element |
| | Account Type | 2 | 0x01 | Credit Account |
| | | | 0x02 | Debit Card |
| | | | 0x03 | Limited Credit Account |
| | Max Duratio | 1 | 0x5A | ID of Max Duration Information Element |
| | Duration | 4 | | Max Duration of call in seconds |

FIG. 12 - Authorization Confirm Message 0x42 Information Elements

| Message Elements | | Bytes | Value | Description |
|---|---|---|---|---|
| Authorization Reject Message 0x43 Information Elements | | | | |
| | Req Seq No | 1 | 0x65 | ID of Request Sequence Number Information Element |
| | Request Sequence Number | 2 | | This is a monotonically increasing number unique to the sender. It shall be returned by the receiver in any messages associated with this specific message. |
| | Cause | 1 | 0x0E | ID of Cause Information Element |
| | Cause Code | 2 | 0x01 | Success |
| | | | 0x02 | Already Being Configured |
| | | | 0x03 | Not in Host List |
| | | | 0x08 | Validation Failed |

FIG. 13 - Authorization Reject Message 0x43 Information Elements

| Message Elements | | Bytes | Value | Description |
| --- | --- | --- | --- | --- |
| End of Call Message 0x44 Information Elements (Section 1) | | | | |
| | Req Seq No | 1 | 0x65 | ID of Request Sequence Number Information Element |
| | Request Sequence Number | 2 | | This is a monotonically increasing number unique to the sender. It shall be returned by the receiver in any messages associated with this specific message. |
| | Rec_id | 1 | 0x5D | ID of Rec_id Information Element |
| | Length (L) | 1 | | Length of Recd_id |
| | Record ID | L | | Record ID of CDR |
| | Call Date | 1 | 0x5e | ID of Call Date Information Element |
| | Date | 8 | | ASCII Date in format YYYYMMDD |
| | Call Time | 1 | 0x5F | ID of Call Time Information Element |
| | Time | 6 | | ASCII Tim in format HHMMSS |
| | Billing UID | 1 | 0x63 | ID of UID Information Element |
| | Length (L) | 1 | | Length of UID |
| | Billing UID | L | | ASCII UID to Bill this call to |
| | OrigCh ID | 1 | 0x60 | ID of Originating Channel ID Information Element |
| | IP Address | 4 | | IP Address |
| | span_id | 2 | | Span ID |
| | channel_id | 2 | | Channel ID |

FIG. 14a - End of Call Message 0x44 Information Elements (Section 1)

| TmCh ID | 1 | 0x64 | ID of Terminating Channel ID Information Element |
|---|---|---|---|
| IP Address | 4 | | Terminating IP Address |
| span_id | 2 | | Terminating Span ID |
| channel_id | 2 | | Terminating Channel ID |
| Disc Reason | 1 | 0x61 | ID of Disconnect Reason Information Element |
| Reason Code | 1 | 0x01 | Terminating Side Disconnect |
| | | 0x02 | Originating Side Disconnect |
| | | 0x03 | Terminating Side All Trunks Busy |
| | | 0x04 | Far end number busy |
| | | 0x05 | Incomplete Dial |
| | | 0x06 | Dropped Call |
| Orig UID | 1 | 0x46 | ID of UID Information Element |
| Length (L) | 1 | | Length of UID |
| Originating UID | L | | ASCII Originating UID |
| Term UID | 1 | 0x62 | ID of UID Information Element |
| Length (L) | 1 | | Length of UID |
| Terminating UID | L | | ASCII Terminating UID |
| ORIG E164 | 1 | 0x69 | ID of OrigE164 Information Element |
| Length (L) | 1 | | Length of Originating E164 Number |
| Originating E164 Number | L | | ASCII Originating E164 Number |
| TERM E164 | 1 | 0x70 | ID of TermE164 Informationg Element |
| Length (L) | 1 | | Length of Terminating E164 Number |
| Terminating E164 Number | L | | ASCII Terminating E164 Number |
| Usage | 1 | 0x6c | ID of Usage Information Element |
| Usage | 4 | | Usage in Host Byte Order |

FIG. 14b - End of Call Message 0x44 Information Elements (Section 2)

| Message Elements | | Bytes | Value | Description |
|---|---|---|---|---|
| End of Call Ack Message 0x45 Information Elements | | | | |
| | Req Seq No | 1 | 0x65 | ID of Request Sequence Number Information Element |
| | Request Sequence Number | 2 | | This is a monotonically increasing number unique to the sender. It shall be returned by the receiver in any messages associated with this specific message. |

FIG. 15 - End of Call Ack Message 0x45 Information Elements

| Message Elements | | Bytes | Value | Description |
|---|---|---|---|---|
| Bandwidth Request Message 0x47 Information Elements | | | | |
| | Req Seq No | 1 | 0x65 | ID of Request Sequence Number Information Element |
| | Request Sequence Number | 2 | | This is a monotonically increasing number unique to the sender. It shall be returned by the receiver in any messages associated with this specific message. |
| | Class of Service | 1 | 0x6e | ID of Class of Service Information Element |
| | Number of Bytes in IE | 1 | | Number of bytes in Class of Service Information Element |
| | Class of Service | 1 | 0x01 | Mulaw |
| | | | 0x05 | SX7300 |
| | Farend IP Addr | 1 | 0x6f | ID of Farend IP Address Information Element |
| | Length (L) | 1 | | Length of Farend IP Address |
| | Farend IP Address | L | | Farend IP Address |
| | Orig UID | 1 | 0x46 | ID of Originating UID information Element |
| | Length (L) | 1 | | Length of Originating UID |
| | Originating UID | L | | ASCII Originating UID |

FIG. 16 - Bandwidth Request Message 0x47 Information Elements

| Message Elements | | Bytes | Value | Description |
|---|---|---|---|---|
| Bandwidth Confirm Message 0x48 Information Elements | | | | |
| | Req Seq No | 1 | 0x65 | ID of Request Sequence Number Information Element |
| | Request Sequence Number | 2 | | This is a monotonically increasing number unique to the sender. It shall be returned by the receiver in any messages associated with this specific message. |

FIG. 17 - Bandwidth Confirm Message 0x48 Information Elements

| Message Elements | Bytes | Value | Description |
|---|---|---|---|
| Bandwidth Reject Message 0x49 Information Elements | | | |
| Req Seq No | 1 | 0x65 | ID of Request Sequence Number Information Element |
| Request Sequence Number | 2 | | This is a monotonically increasing number unique to the sender. It shall be returned by the receiver in any messages associated with this specific message. |

FIG. 18 - Bandwidth Reject Message 0x49 Information Elements

| Message Elements | Bytes | Value | Description |
|---|---|---|---|
| FaxCall Message 0x4A Information Elements | | | |
| Class of Service | 1 | 0x6e | ID of Class of Service Information Element |
| Number of Bytes in IE | 1 | | Number of bytes in Class of Service Information Element |
| Class of Service | 1 | 0x01 0x05 | Mulaw SX7300 |

FIG. 19 - FaxCall Message 0x4A Information Elements

| Message Elements | Bytes | Value | Description |
|---|---|---|---|
| GK Trunks Busy Message 0x4E Information Elements | | | |
| Req Seq No | 1 | 0x65 | ID of Request Sequence Number Information Element |
| Request Sequence Number | 2 | | This is a monotonically increasing number unique to the sender. It shall be returned by the receiver in any messages associated with this specific message. |

FIG. 20 - GK Trunks Busy Message 0x4E Information Elements

| Message Elements | Bytes | Value | Description |
|---|---|---|---|
| GK TRUNKS BUSY ACK MESSAGE 0x4F Information Elements | | | |
| Req Seq No | 1 | 0x65 | ID of Request Sequence Number Information Element |
| Request Sequence Number | 2 | | This is a monotonically increasing number unique to the sender. It shall be returned by the receiver in any messages associated with this specific message. |

FIG. 21 - GK TRUNKS BUSY ACK MESSAGE 0x4F Information Elements

| Message Elements | Bytes | Value | Description |
|---|---|---|---|
| GK TRUNKS BUSY ACK MESSAGE 0x4E Information Elements | | | |
| Req Seq No | 1 | 0x65 | ID of Request Sequence Number Information Element |
| Request Sequence Number | 2 | | This is a monotonically increasing number unique to the sender. It shall be returned by the receiver in any messages associated with this specific message. |

FIG. 22 - GK TRUNKS BUSY ACK MESSAGE 0x4E Information Elements

| Message Elements | Bytes | Value | Description |
|---|---|---|---|
| GK TRUNKS UNBUSY MESSAGE 0x4C Information Elements | | | |
| Req Seq No | 1 | 0x65 | ID of Request Sequence Number Information Element |
| Request Sequence Number | 2 | | This is a monotonically increasing number unique to the sender. It shall be returned by the receiver in any messages associated with this specific message. |

FIG. 23 - GK TRUNKS UNBUSY MESSAGE 0x4C Information Elements

| Message Elements | Bytes | Value | Description |
|---|---|---|---|
| GK TRUNKS UNBUSY ACK MESSAGE 0x4D Information Elements | | | |
| Req Seq No | 1 | 0x65 | ID of Request Sequence Number Information Element |
| Request Sequence Number | 2 | | This is a monotonically increasing number unique to the sender. It shall be returned by the receiver in any messages associated with this specific message. |

FIG. 24 - GK TRUNKS UNBUSY ACK MESSAGE 0x4D Information Elements

| Message Elements | Bytes | Value | Description |
| --- | --- | --- | --- |
| Heartbeat Message 0x53 Information Elements | | | |
|     Req Seq No | 1 | 0x65 | ID of Request Sequence Number Information Element |
|     Request Sequence Number | 2 | | This is a monotonically increasing number unique to the sender. It shall be returned by the receiver in any messages associated with this specific message. |
|     UIDPIN | 1 | 0x6B | ID of UIDPIN Information Element |
|     Length (L) | 1 | | Length of UIDPIN |
|     UIDPIN | L | | ASCII UIDPIN |
|     Active Calls | 1 | 0x7c | ID of Active Calls Information Element |
|     Number of UID-SeqNum Tuples | 1 | | Number of Sequence Number and Originating UID Tuples in this message |
|     SeqNum0 | 1 | | first byteof Sequence Number |
|     SeqNum1 | 1 | | second byte of Sequence Number |
|     Orig UID Length | 1 | | ASCII Terminating UID |
|     Originating UID | L | | ASCII Originating UID |

FIG. 25 - Heartbeat Message 0x53 Information Elements

PRIVATE DIALING PLAN FOR VOICE ON A PACKET-BASED NETWORK

This application claims the benefit of U.S. Provisional Application No. 60/134,871, entitled "Private Dialing Plan for Voice on a Packet-Based Network," filed on May 19, 1999, and of U.S. Provisional Application No. 60/152,045, entitled "Private Dialing Plan for Voice on a Packet-Based Network," filed on Sep. 2, 1999, the subject matter of which is incorporated herein by reference.

BACKGROUND OF THE INVENTION

1) Technical Field

This invention relates generally to Internet Telephony, and more specifically to telephone dialing protocols.

2) Discussion of Prior Art

In conventional telephone systems, telephone numbers are a series of signaling or identifying digits that are used for a variety of purposes. A common use is dialing a telephone number corresponding to a telephone that a caller wishes to reach. Other uses include various telephone identification roles (such as caller ID or call-returning services) or for billing a call to a particular telephone account. A standard plan for assigning telephone numbers, such as the North American telephone numbering plan, is generally used as the basis for assigning telephone numbers for the Public Switched Telephone Network (PSTN). In conventional telephone service, a dialing plan refers to the calling methods, shortcuts and services which a caller selects based on the presence or absence of special digits or symbols (#,*) which are appended to the assigned telephone number or used in place of the telephone number. For example, with conventional telephone service, calls outside the local area code are dialed starting with a "1," international calls are dialed starting with "011," and custom calling services such as call return, call forwarding or speed dialing of stored telephone numbers are often selected by dialing shortcuts consisting of one or two digits and a symbol.

Internet Telephony bypasses portions of the PSTN and instead routes telephone calls over the Internet, typically avoiding long distance telephone charges. Previously, Internet Telephony required users to master a complex set of information and have a certain familiarity with Internet Protocol (IP) addresses, nickname servers, and URL terminology. This unfamiliar and sometimes arcane set of access methodologies impeded the growth of Internet Telephony because everyday consumers found it excessively complicated compared with traditional telephony.

The most commonly-used technology for Internet Telephony is NetMeeting, developed by Microsoft. NetMeeting requires two access methodologies for users to find and connect to each other. The first is for a user to log onto a series of servers called ILS servers and wait for the correct server to be explicitly identified by the e-mail address of the other party. Once the e-mail address is displayed, the user can click on the address link that will send the other party a message requesting that they accept the telephone connection. On the surface this seems uncomplicated, but increasing numbers of NetMeeting users keep the ILS servers too busy for new connections. Hence, there is no way for an entering user to connect with another user until someone leaves the ILS server, thus allowing access and subsequently a connection.

NetMeeting's second access methodology for using Internet Telephony further confounds users. A connection must be established by entering the other party's IP address in order to notify them that the caller would like to make a telephonic connection. The major impediment to making a successful connection using this method is that some dial-up users have a different IP address each time they log in. Casual Internet users must master of a complex set of utilities beyond their typical competency just to look up their own current IP address. Even if a calling user can determine his correct IP address, it must be relayed to the called user. This requires making a telephone call or sending an electronic mail message, which tends to defeat the utility of Internet Telephony.

There is, therefore, a need to overcome the above-cited shortcomings of today's Internet Telephony.

SUMMARY OF THE INVENTION

The present invention makes Internet Telephony as simple to use as a conventional telephone. The invention permits simple, telephone-like numbers to be used for Internet Telephony. The invention helps make Internet Telephony more universal, and provides users a robust system that is both readily available and easily understandable.

With the dialing plan of the invention, the telephone number plans and dialing plans of conventional telephone systems are expanded and modified to be well-suited to an Internet-based system.

The dialing plan of the present invention uses a signaling protocol such as Q.931 to establish, maintain and release switched connections over a packet-based network. The dialing plan uses conventional telephone numbers as a basis for identifying both the calling party and the called party. Database search keys based on conventional telephone numbers of dialing plan members are used to access various plan database information, such as the user's IP address and any optional services or features available for that member.

The invention herein will be called the ZeroPlus dialing plan.

After users have registered their conventional telephone numbers in the ZeroPlus system, users may make telephone calls on-net to on-net, off-net to on-net, on-net to off-net, and off-net to off-net. The ZeroPlus number is user-specific, and, once assigned through the ZeroPlus system, becomes the user's permanent Internet telephone number for ZeroPlus calls.

Registered users may use a conventional telephone to call a ZeroPlus Internet Telephony gateway. Once connected to that number, members are prompted for a Personal Identification Number (PIN) code, enabling the off-net call. Registered users who are away from a computer can simply dial either a local direct-dial telephone access number for ZeroPlus, if available, or, for a nominal additional charge, dial a 1-800 number.

This private dialing plan is called "ZeroPlus," referring to the fact that on-net calls are placed by dialing "0" plus a conventional telephone number.

Adding to this simplicity is that user's Internet Telephone numbers are based on one of the user's normal telephone numbers. Not only is the number easy to use and remember, it is assigned to a respective user permanently for his or her exclusive use on the ZeroPlus system. Consequently, users can contact each other without having to remember a new number, nickname, IP address, or e-mail address as in other Internet Telephony methods. The primary difference between using a traditional telephone number and an Internet telephone number according to the invention is that when an on-net member who is logged onto the ZeroPlus gateway dials an on-net counterpart, "0" plus the number are dialed as opposed to the traditional "1" plus the number dialed for traditional long distance telephone calls.

Placing and receiving a ZeroPlus call either on or off the Internet is simple and transparent for the user, requiring no special training or technical competency. In so far as possible, the ZeroPlus invention has a user interface that closely resembles a conventional telephone system. When a ZeroPlus call is placed to the IP address of an on-line destination computer which has the ZeroPlus client installed and running, the destination computer will generate an audible ring. The call originator will hear a "ringback" sound analogous to that heard on a traditional telephone network. The ID of the current calling party will be passed to the computer of the called party. The called party can choose to answer the call by "picking up" the incoming call much like a normal telephone call, if the current status of the data network permits. If the called party is not on-line or does not have the ZeroPlus client launched, then the calling party will hear a "fast busy" sound, indicating that the party is not currently on-line, again emulating the traditional telephone network.

BRIEF DESCRIPTION OF THE DRAWINGS

FIG. 4 shows the Gatekeeper Message format;

FIG. 5 shows the Gatekeeper Request Message Information Elements format;

FIG. 6a shows the Gatekeeper Confirmation Message Information Elements (Section 1) format;

FIG. 6b shows the Gatekeeper Confirmation Message Information Elements (Section 2) format;

FIG. 7 shows the Gatekeeper Rejection Message Information Elements format;

FIG. 8 shows the Admission Request Message Information Elements format;

FIG. 9a shows the Admission Confirmation Message Information Elements (Section 1) format;

FIG. 9b shows the Admission Confirmation Message Information Elements (Section 2) format;

FIG. 10 shows the Admission Reject Message Information Elements format;

FIG. 10 shows the Authorizing Request Message Information Elements format;

FIG. 12 shows the Authorizing Confirmation Message Information Elements format;

FIG. 13 shows the Authorizing Rejection Message Information Elements format;

FIG. 14a shows the End of Call Message Information Elements (Section 1) format;

FIG. 14b shows the End of Call Message Information Elements (Section 2) format;

FIG. 15 shows the End of Call Ack Message Information Elements format;

FIG. 16 shows the Bandwidth Request Message Information Elements format;

FIG. 17 shows the Bandwidth Confirmation Message Information Elements format;

FIG. 18 shows the Bandwidth Reject Message Information Elements format;

FIG. 19 shows the FaxCall Message Information Elements format;

FIG. 20 shows the GK Trunks Busy Message 0x4E Information Elements format;

FIG. 21 shows the GK Trunks Busy ACK Message 0x4F Information Elements format;

FIG. 22 shows the GK Trunks Busy ACK Message 0x4E Information Elements format;

FIG. 23 shows the GK Trunks Unbusy Message 0x4C Information Elements format;

FIG. 24 shows the GK Trunks Unbusy ACK Message 0x4D Information Elements format;

FIG. 25 shows the Heartbeat Message Information Elements format;

DETAILED DESCRIPTION OF PREFERRED EMBODIMENTS

Figure 1:
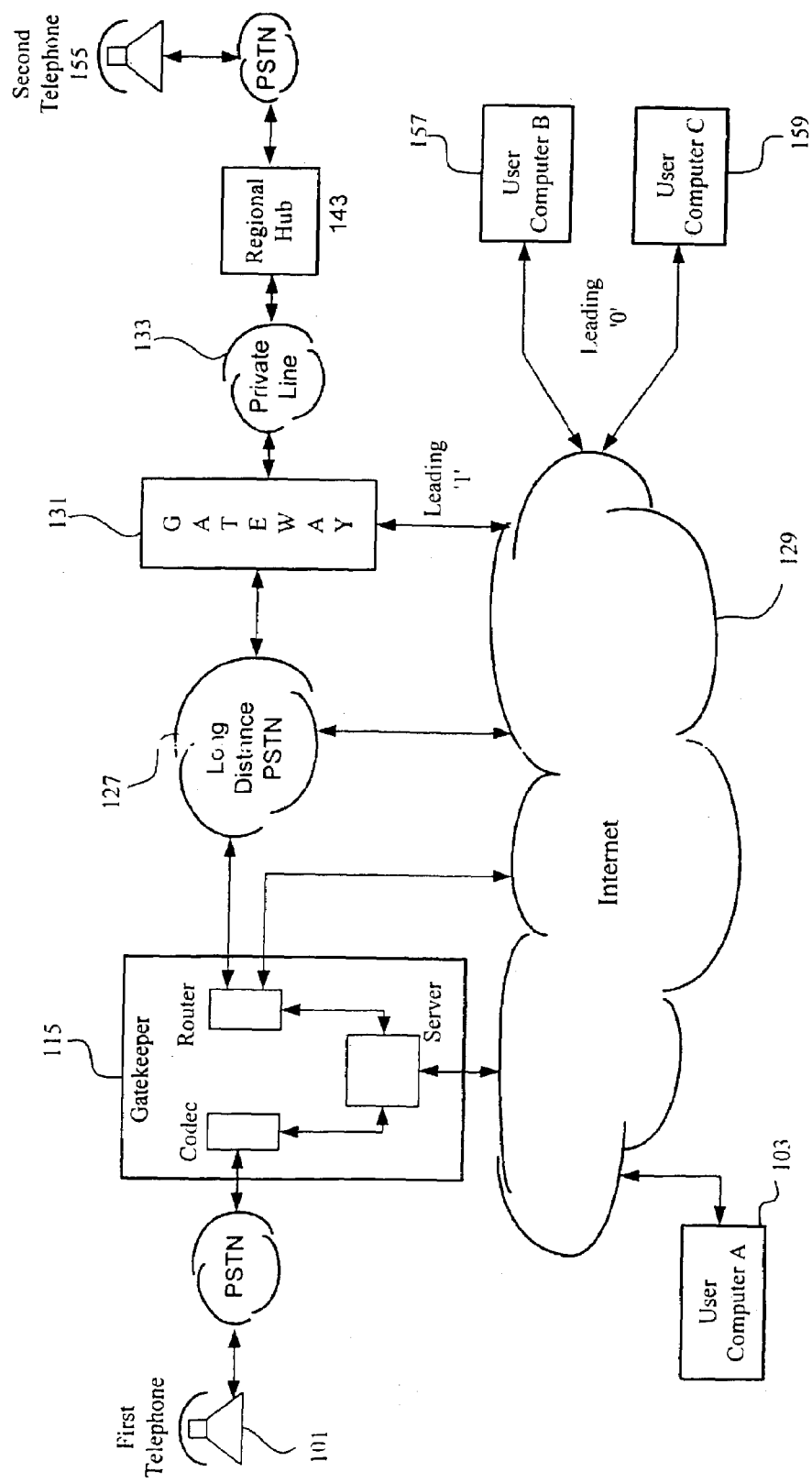
FIG. 1 is an end-to-end diagram of the private dialing plan network.

As shown in FIG. 1, ZeroPlus has a unique multi-access architecture. Calls are managed by Internet "gatekeepers." Users can make telephone connections to or from Internet-based computers 103, 157 and 159, and also make connections to or from conventional analog telephones 101 and 155. For illustrative purposes it is assumed that user computer A 103 initiates the call, and user computer B 157 or user computer C 159 receives the call. The roles of caller and receiver can be interchanged among these user computers. A ZeroPlus gatekeeper 115 A receives ZeroPlus on-net calls over the Internet or another network from an initiating user computer A 103, or over a telephone line through the PSTN from an initiating conventional telephone 101. The gateway converts the analog telephone signals into data packets for transmission on the network. Gatekeeper 115 determines exactly how to route the call through either Internet 129, or some combination of conventional telephone networks. A call directed to an on-net computer IP address is routed through Internet 129 to the destination user computers B 157 or C 159. A call directed to an off-net conventional telephone is routed from the Internet through a regional gateway 131 to one of several regional or local telephone carrier destination "hubs" 143, and then to the receiving conventional telephone 155.

Traditional telephone networks require large, complex business and technical departments whose job it is to add and connect new users and to bill existing users. The ZeroPlus system allows new users to be rapidly connected to the system by logging onto the Internet and completing an on-line form. This information is then stored in the ZeroPlus database where it can be retrieved to verify assigned user telephone numbers, define a user profile and generate on-line billing by matching usage with user data stored in the database. This eliminates much of the workforce typically required in traditional telephony, significantly reducing the cost of user acquisition and maintenance.

On a traditional telephone network, users are not connected until a technician receives the customer information on a work order and determines and implements the required connections to the telephone network. This often involves a delay of days or weeks. ZeroPlus users are given immediate access to the ZeroPlus system by virtue of its ability to store registration data, to interact in real time with the system database and to immediately assign and validate a telephone number. Upon completion of the new user processing, users are immediately e-mailed a personal PIN code so they can begin using the service. Provided they have ZeroPlus software loaded and launched on their systems, have entered their user access number, and are allowed to make the call by the gate keeper, ZeroPlus users have immediate access to any on-net ZeroPlus user computer or off-net PSTN telephone number.

Conventional telephones usually connect to the PSTN through a physical connection made between a set of copper wires and a Class 5 switch at the PSTN central office. On the ZeroPlus network, users are connected via an analog modem, cable modem, Digital Subscriber Line (DSL) modem, Integrated Services Digital Network (ISDN) modem, 802.11 wireless modem, or any other digital network access that is now, or in the future will become, available.

An important benefit of the ZeroPlus telephone numbering scheme is that, through the use of a Primary Rate Interface (PRI) digital gateway and the ZeroPlus numbering scheme, every digital call center switch and Integrated Voice Response (IVR) system in existence can route ZeroPlus calls. This means that call centers can benefit from their existing investment in call center technology to route calls from the PSTN. Unlike competing systems that use nicknames and e-mail addresses, when ZeroPlus calls are received, existing switches, PBX, or IVR systems can be configured to route ZeroPlus calls to call center agents just like calls that have originated from the PSTN.

Signing up for ZeroPlus service is simple and user friendly. New ZeroPlus users visit the ZeroPlus website to sign up and initiate service. A Registration page collects information about customers to create a database of user and routing information. During the sign-up process, a sequence of messages is displayed to the user. The various messages and user interfaces described herein are illustrative examples of how the sign-up process is conducted.

After potential users request an Internet Phone number, a legal contract appears which the registrant is asked to carefully consider and either accept or decline. At the end of the contract, two buttons appear, inviting the registrant the option of indicating "I accept" or "I decline."

After accepting, the first field entered will be the user's e-mail address. After inputting the e-mail address, a search is done to ensure that the entered e-mail address does not already have an assigned a phone number. If it does, the user will be notified of the ineligibility for a new ZeroPlus telephone number for that entered e-mail address. Otherwise, the process will continue.

Fields are provided so that the customer can input:
First Name
Last Name
Address 1
Address 2
City
State (pull down selection menu)
Zip Code
Home Phone Number
Password (at least eight characters)
Entry for two friends or business acquaintances who should be contacted regarding the service. An e-mail will automatically be generated to those e-mail addresses, such as, "first name, last name has asked us to inform you that he/she has just received his/her Internet Phone Number from www.ZeroPlus.com. If you wish to talk to first name for free, whenever online, please visit us and get your own ZeroPlus Number!"

After inputting the information, two buttons appear at the end of the fields, one for "Give Me My Internet Phone Number" and the other for "Clear Fields."

After the user has submitted the customer information, the service searches the database to verify that the requested number has not been previously registered. If it has not, the service responds by offering the customer the desired telephone number, which displays a screen, for example, which says, Your new Internet phone number is "0+home phone." Do you want to keep this number or would you like us to offer another one? If you wish to select another number, it must start with 0+XXX as the first four numbers.

A "Keep this number" or "Propose another number" button appears at the bottom of the page.

If a user wants to propose a special telephone number, the user is limited to telephone numbers within their current area code. If the person wants to select another number, a screen appears that says, "I wish to have the following Internet phone number:"
The screen should show 0+XXX-___ ____, where the last seven digits can be selected by the user, and the XXX is their current area code.

After the information has been entered, two buttons appear at the end of the fields, one for "Submit my Internet telephone number" and the other for "Clear fields."

The service searches for the number, and if it's available, tells the user:

Congratulations! Your new Internet telephone number is 0+XXX-___ ____. Please write it down.

If the requested number is not available, the program scrolls through the number database until it finds the next available sequential number, and offers that number to the user:

The number you requested is not available. The next closest number is 0+XXX-___ ____. Would you like to keep this number?

"Keep this number" and "Propose another number" buttons appear at the bottom of the page.

This process continues until the user has chosen a permanent Internet telephone number.

Some numbers will be blocked by this system. If a customer requests an 800, 888, 100, 200, 300, 400, 500, 600, 700, 877, or 900 number, a screen appears indicating:

The 0+___ ____number you requested has been reserved for the holder of the existing telephone number. If you or your company own this existing number and wish to use it as your Internet phone number, please call us at 1-800-___ ___

Two buttons should appear, saying "Propose another number" or "Back to home page" sending the person back to the original link.

The final screen for completion asks whether the user wants his or her number listed in the 0+directory ("White Pages"). The user selects one of three choices:

"I wish to have my Internet telephone number listed in the 0+directory, along with my name, city, state, and country."

"I wish to have my Internet telephone number listed in the 0+directory, along with my name only."

I do not wish to have my Internet telephone number listed in the 0+directory

The final screen also provides users with the option be notified of additional features that are available from the ZeroPlus service. The customer selects one of two choices:

"Please notify me by e-mail when new ZeroPlus services are available"

"Do not notify me when new services are available."

In addition to a discrete telephone number, each user will be required to have a unique nickname, which is equivalent to an e-mail address. The user should be able to propose a nickname, find out if it has been taken, and if it has, have the opportunity to propose another nickname. The screens are developed similarly to those listed under "ZeroPlus Number Proposal."

After the user has selected their Internet telephone number, he/she will automatically be able to download the client GUI. Any system requirements will be listed, and a button will be clicked to "Download 0+Software."

As this information is collected and logged into the database, a directory system enables users to look up a person's Internet telephone number on ZeroPlus' "White Pages" by inputting names, addresses, city, state, etc.

When for example, user computer A 103 logs in, it notifies the gatekeeper of its IP address. Each gateway accepts calls that are routed to it based on the routing tables that are set up on the gatekeeper. Every time an administrator adds a new gateway, the routing tables must be updated to ensure that the gateway will handle all PSTN-bound calls in a particular set of area codes. The gateway will only handle calls that the administrator has routed to it.

If a ZeroPlus user dials a local PSTN to place a call at least partially routed over the Internet, he or she will be greeted by a voice asking for the ZeroPlus number followed by the PIN Code. Once the caller enters that information and press the pound (#) key, the caller will be asked for the number that they wish to call. At this point they are given the option of dialing either zero (0) plus the number (e.g. "0 301 601 0000"), or one (1) plus the number (e.g. "1 301 601 0000") followed by the pound (#) key. If the user dials a ZeroPlus number the gatekeeper will be contacted and provide the IP address of the ZeroPlus member's personal computer (PC). If the leading number dialed is "1," the gatekeeper provides the IP address of the gateway responsible for terminating calls to that area and city code. One plus numbers' routes are determined by the administrator's entry into the routing tables. ZeroPlus numbers are routed according to the IP address assigned by the ISP when the user logged into the ISP's service.

A dialed number is converted into an IP address by a simple process. The caller enters zero ("0") plus a ten digit telephone number into a client ZeroPlus application by either of two methods. One is by clicking the number buttons on the application GUI which simulates the touch-tone pad on a standard telephone. The other method is to use the numbers on the computer keyboard to dial the desired telephone number. Either method assumes that the user has established a network connection and launched the ZeroPlus client application.

Once the telephone number of the called party is entered into the application by either of the two methods above, the user can either press the <enter> key on the keyboard or click the "Talk" button on the ZeroPlus GUI. This action initiates a message, with the called party's telephone number and the requested current IP address, to the gatekeeper 115. The gatekeeper will look up the called party's telephone number on the database server and, using data therein, determine the current or last known IP address for the called party's telephone number. The gatekeeper sends a message with the called party IP address back to the calling party's client.

At this juncture, the calling party's client launches the standard call setup messages directly to the called party's IP address. If the called party is online, the client will respond in kind with the standard setup message responses and, once negotiated, the voice session will be opened in both directions. If the called party is not online and has call forwarding engaged, the calling party's client will attempt to forward the call based on forwarding information sent when it first requested the number translation.

Figure 2:
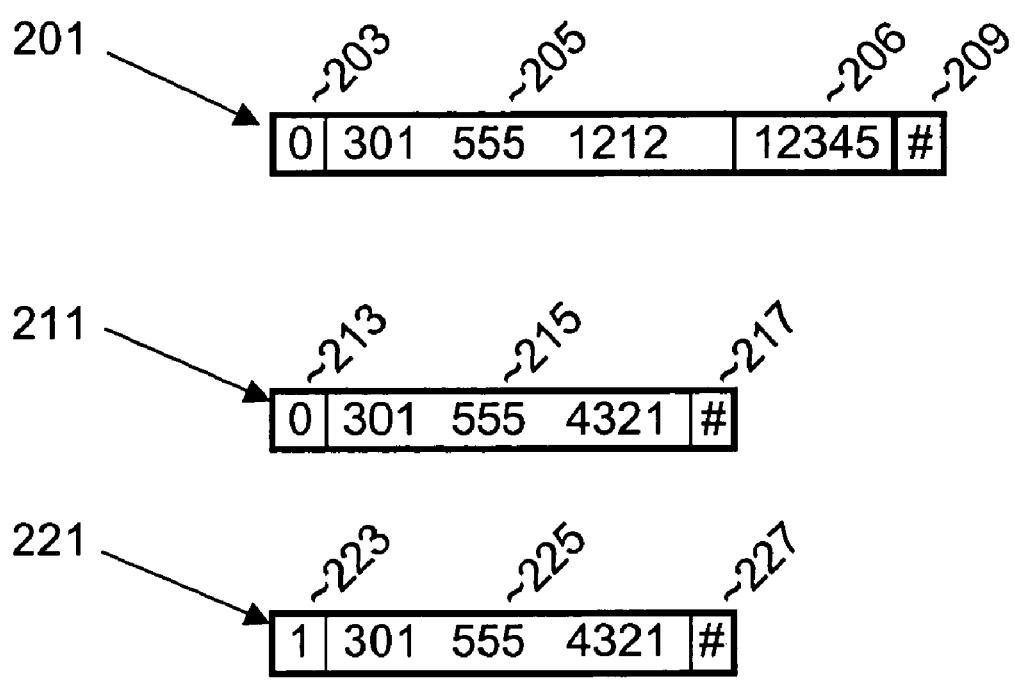
FIG. 2 shows several of the dialing sequences used in the plan.

Accordingly, FIG. 2 shows an access dialing sequence 201 dialed by a user to connect to the plan Internet gateway, and sequences 211 and 221, used to connect with the call recipient. An on-line computer accesses the gateway by dialing sequence 201 beginning with element 203, which is a leading "0" digit, followed by the caller's registered ZeroPlus Internet telephone number 205 and a corresponding user PIN code 206.

After sequence 201 gains access to the gateway 115, the caller can place calls using sequence 211 to obtain an on-net computer-to-computer call. To complete a desired connection, the gatekeeper 115 accesses a database (not shown) which tracks the IP addresses corresponding with the destination number. The destination number selected by the calling user is then associated with the IP address of the destination computer 157.

Alternately, an on-net caller can use sequence 221 to place a call to an off-net conventional telephone 155. The only difference between sequence 211 and sequence 221 is that on-network calls in sequence 211 are proceeded with a "0" while off-network calls to conventional telephones in sequence 221 are proceeded with a "1." Thus, to dial an off-net telephone number, a ZeroPlus user simply dials sequence 221 ("1" plus the destination telephone number) from the ZeroPlus Graphical User Interface (GUI) client software, thus sending the information to the Internet Telephony gateway best situated to deliver the call cost effectively, which is usually the gateway closest to the destination. In this way, the simplified dialing plan has originated a call from a data network such as the Internet 129 to the PSTN.

Thus, the access code for gateway calling consists of a combination of both the registered ZeroPlus telephone number and a member PIN. Number portability is made available by the ZeroPlus system by deriving both ZeroPlus access numbers and desired destination numbers from the users' conventional telephone numbers. Upon entering their gateway access code, users will be prompted for the telephone number they wish to reach. Again, this can be any on-net "0" plus telephone number or an off-net "1" plus telephone number.

Zeroplus Operating Modes

Calls can be placed in various modes, including PC-to-PC, PC-to-Phone, Phone-to-PC, and Phone-to-Phone. Further, PC-to-PC calls can feature call waiting, call forwarding, call transfer, three-way calling, and voice mail. User computer A 103, user computer B 157 and user computer C 159 are referred to as Stations A, B, and C in this section.

This description assumes that all parties/stations (A, B, C, and D) have data connectivity and have already logged into ZeroPlus, and that an IP Address is already associated with each these stations. Note that station D does not explicitly appear on the diagrams.

Figure 3:
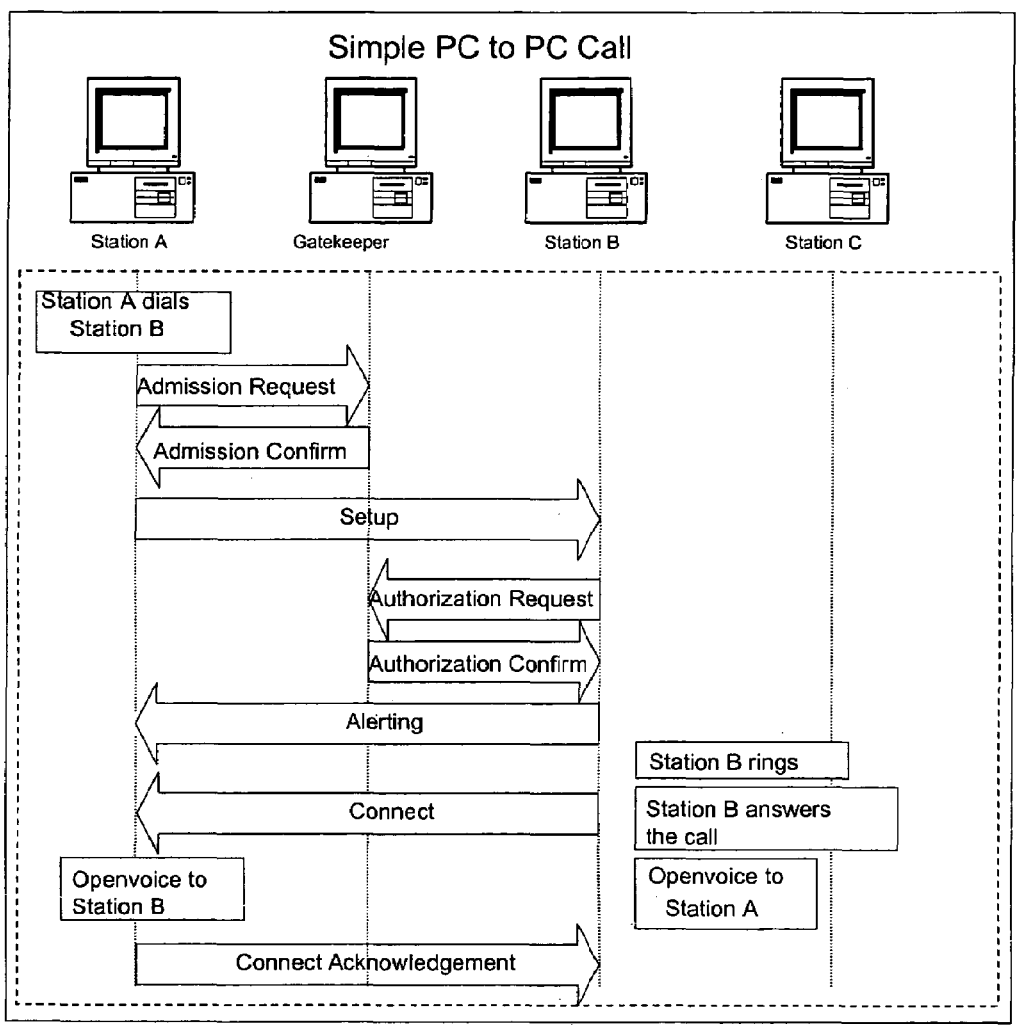
FIG. 3 is a diagram of activities associated with a simple PC-to-PC call.

As shown in FIG. 3, in PC-to-PC calls, Station A 103 dials Station B's 157 or 159 ZeroPlus number. The ZeroPlus application sends an Admission Request message which contains the calling number (Station A) and the called number (Station B) to the Gatekeeper 115. The Gatekeeper responds with an Admission Confirm containing IP Addresses which route to Station B. When Station B receives a Setup message, it sends an Authorization Request to the Gatekeeper. The Gatekeeper responds to Station B with an Authorization Confirm. Since it is available to accept the call, Station B then responds to Station A's Setup message with an Alerting message, and begins to ring. Station A begins to ring when it receives the Alerting message from Station B. When Station B answers the call, a Connect message is sent to Station A and a voice channel is opened from Station B to Station A. When Station A receives the Connect message from Station B, it responds to the Connect message with a Connect Acknowledgement and opens a voice channel from Station A to Station B.

Signaling Messages Interacting with the Gatekeeper

Various signaling message formats are used between end-point stations, gateways and the gatekeeper. All these message formats are specially defined for this inventions.

Gatekeeper Logging-In Messages

Gatekeeper Request—FIG. 5 shows the Gatekeeper Request Message Information Elements format. When the user logs in, a Gatekeeper Request Message is sent from the station to the gatekeeper to request user validation.

Gatekeeper Confirm—FIG. 6a shows the Gatekeeper Confirmation Message Information Elements (Section 1) format. FIG. 6b shows the Gatekeeper Confirmation Message Information Elements (Section 2) format. The gatekeeper sends a Gatekeeper Confirm back to the end station in response to a Gatekeeper Request if the user information is valid.

Gatekeeper Reject—FIG. 7 shows the Gatekeeper Rejection Message Information Elements format. The gatekeeper sends a Gatekeeper Reject back to the end station in response to a Gatekeeper Request if the user information is invalid.

Call Setup Messages

Admission Request—FIG. 8 shows the Admission Request Message Information Elements format. When a calling station initiates a call, it collects a farend number. This number along with the calling number is passed to the gatekeeper in the Admission request Message.

Admission Confirm—FIG. 9a shows the Admission Confirmation Message Information Elements (Section 1) format. FIG. 9b shows the Admission Confirmation Message Information Elements (Section 2) format. The gatekeeper sends an Admission Confirmation Message back to the calling station in response to an Admission Request Message if the gatekeeper successfully translates the called number.

Admission Reject—FIG. 10 shows the Admission Reject Message Information Elements format. The gatekeeper sends an admission Reject Message back to the calling station in response to an Admission Request Message if the gatekeeper is unsuccessfully in translating the called number.

Bandwidth Management Messages

Bandwidth Request—FIG. 16 shows the Bandwidth Request Message Information Elements format. A gateway sends a gatekeeper a Bandwidth Request Message to request a bandwidth change to the Class of Service.

Bandwidth Confirm—FIG. 17 shows the Bandwidth Confirmation Message Information Elements format. The gatekeeper sends a gateway a Bandwidth Confirm Message in response to a Bandwidth Request Message if the gatekeeper can allocate bandwidth of the Class of Service for this call.

Bandwidth Reject—FIG. 18 shows the Bandwidth Reject Message Information Elements format. The Gatekeeper sends the Gateway a Bandwidth Reject Message in response to a Bandwidth Request Message if the gatekeeper cannot allocate bandwidth of the Class of Service for this call.

Faxcall—FIG. 19 shows the FaxCall Message Information Elements format. The gateway (that detected the fax call) sends a FaxCall Message to the Farend Gateway to inform the Farend Gateway to change its class of service (or compression).

Trunks Busy—FIG. 20 shows the GK Trunks Busy Message 0x4E Information Elements format. This message is sent from a gatekeeper to a gateway to request "busying out" or disabling the remaining available channels because bandwidth constrains the network.

Trunks Busy ACK—FIG. 21 shows the GK Trunks Busy ACK Message 0x4F Information Elements format. FIG. 22 shows the GK Trunks Busy ACK Message 0x4E Information Elements format. These messages are sent from a gateway to a gatekeeper to acknowledge the busy trunks request message.

Trunks Unbusy—FIG. 23 shows the GK Trunks Unbusy Message 0x4C Information Elements format. This message is sent from a gatekeeper to a gateway to request "unbusying out" or enabling all "busied out" channels because of bandwidth availability.

FIG. 24 shows the GK Trunks Unbusy ACK Message 0x4D Information Elements format. These messages are sent from a gateway to a gatekeeper to acknowledge the unbusy trunks request message.

Other Messages

Heartbeat—FIG. 25 shows the Heartbeat Message Information Elements format. A station sends a Heartbeat message to the gatekeeper regularly after it receives a Gatekeeper Confirm message after the station logs in. The message tells the gatekeeper that the station is currently up and running and also tells the gatekeeper the station is currently on call.

To further illustrate the invention, various calling features are described in terms of Zeroplus messages.

PC to PC—Forward Unconditional

Figure 26:
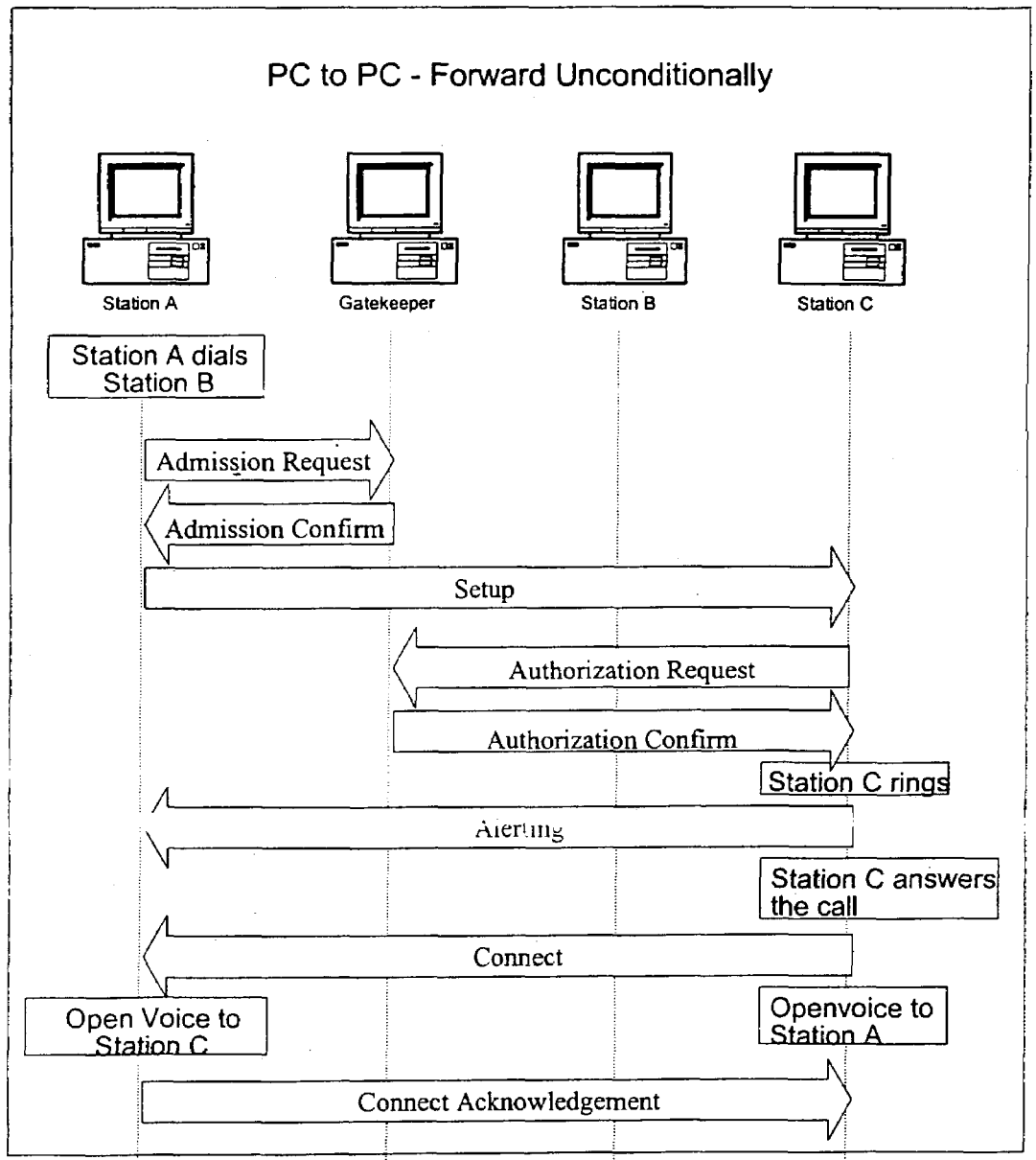
FIG. 26 illustrates PC-to-PC Forward Unconditional.

FIG. 26 illustrates the case in which Station B unconditionally forwards received calls to Station C. Station A dials Station B's ZeroPlus number. The ZeroPlus application sends an Admission Request containing the calling number (Station A) and the called number (Station B) to the Gatekeeper. The Gatekeeper responds with an Admission Confirm message containing IP Addresses which route to Station B. Since Station B is in forward mode, the Admission Confirm message also contains forwarding information (unconditionally forwarded to Station C).

Since Station B is unconditionally forwarded, Station A's ZeroPlus application sends a Setup message to Station C. When Station C receives the Setup message, it sends an Authorization Request to the Gatekeeper, which responds to Station C with an Authorization Confirm. Since Station C is available to accept the call, it then responds to Station A's Setup message with an Alerting message and begins to ring. Station A produces a ringback sound when it receives the Alerting message from Station C. When Station C answers the call, a Connect message is sent to Station A and a voice channel is opened from Station C to Station A. When Station A receives the Connect message from Station C, it responds with a Connect Acknowledgement and opens a voice channel from Station A to Station C.

PC to PC—Forward on Busy

Figure 27:
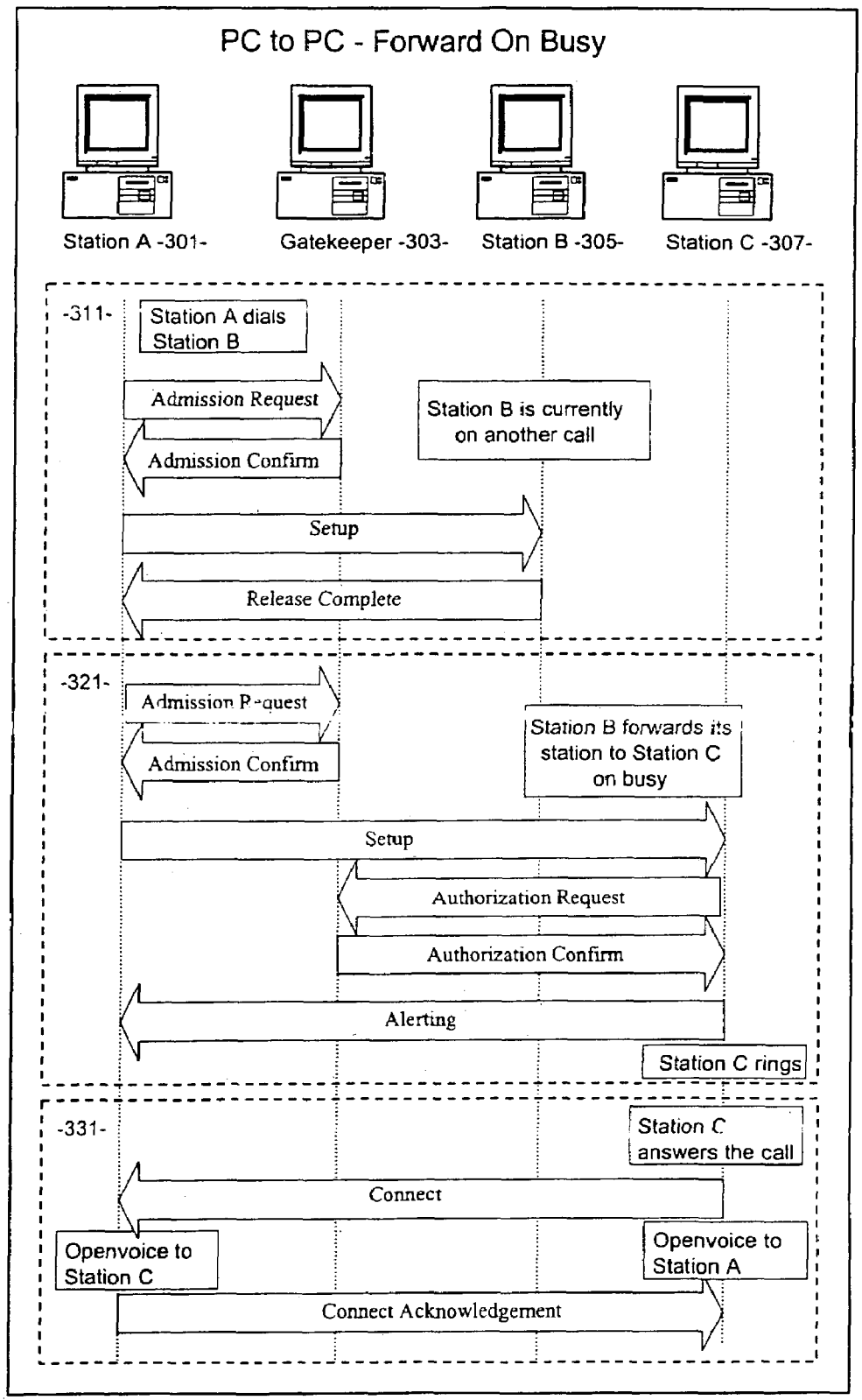
FIG. 27 is a diagram of activities associated with a forward on busy PC-to-PC call.

FIG. 27 illustrates the case in which Station B forwards incoming calls when busy to Station C. Station A dials Station B's ZeroPlus number. The ZeroPlus application sends an Admission Request containing the calling number (Station A) and the called number (Station B) to the Gatekeeper. The Gatekeeper responds with an Admission Confirm message containing IP Addresses which route to Station B. Since Station B is in forward mode, the Admission Confirm message also contains forwarding information (forwarded on busy to Station C).

Station A's ZeroPlus application sends a Setup message to Station B. Station B is already on a call with Station D (not shown) when it receives Station A's Setup message. Therefore, Station B responds to Station A's Setup message with a Release Complete and continues on the call with Station D. Upon receiving the Release Complete message, Station A determines that Station B is currently busy and uses the forwarding information received in the initial Admission Confirm message from the Gatekeeper to send another Admission Request to the Gatekeeper. The Gatekeeper responds with an Admission Confirm message.

When Station A receives the Admission Confirm message from the Gatekeeper, it sends a Setup message to Station C. When Station C receives the Setup message, it sends an Authorization Request to the Gatekeeper, which responds to Station C with an Authorization Confirm. Since it is available to accept the call, Station C then responds to Station A's Setup message with an Alerting message and begins to ring. When Station A receives the Alerting message from Station C, a ringback sound is heard. When Station C answers the call, it sends a Connect message to Station A and opens a voice channel from Station C to Station A. When Station A receives the Connect message from Station C, it responds with a Connect Acknowledgement and opens a voice channel from Station A to Station C.

PC to PC—Forward on No Answer

Figure 28A:
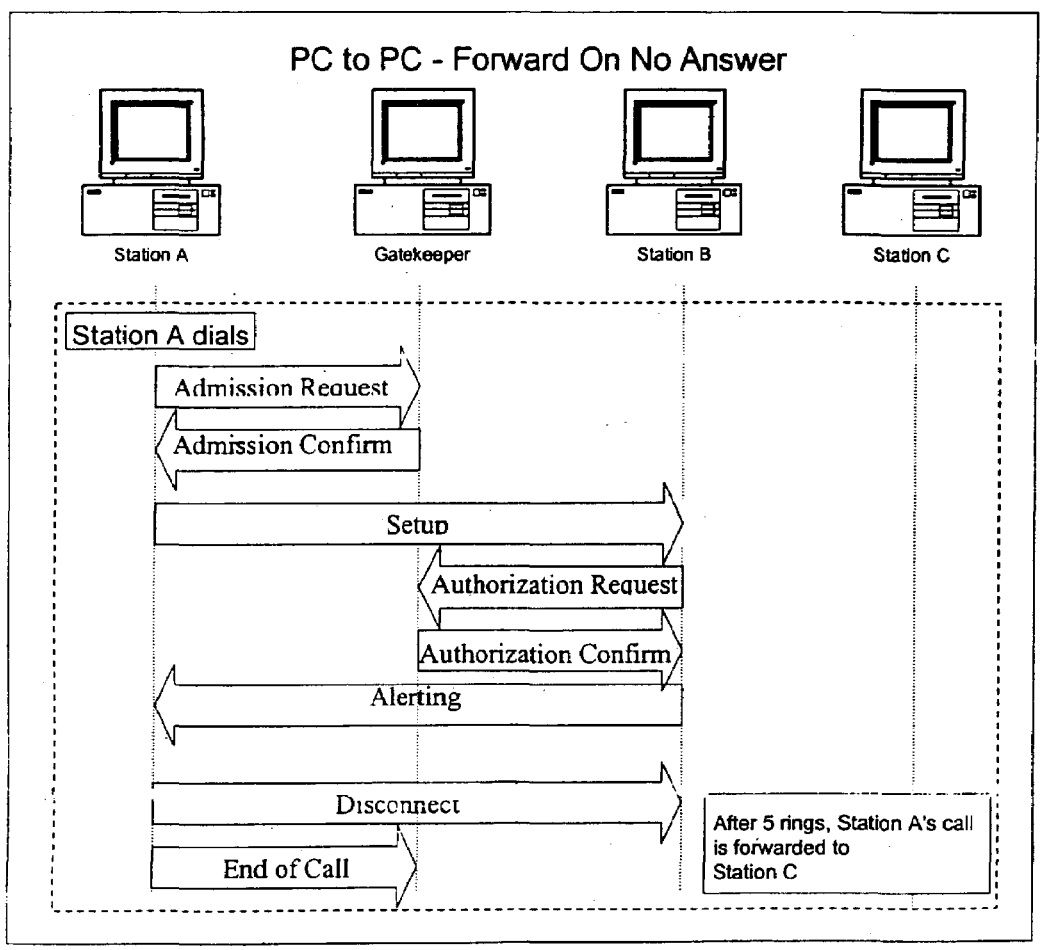
FIGS. 28a and 28b are a diagram of activities associated with a forward on no-answer PC-to-PC call.
Figure 28B:
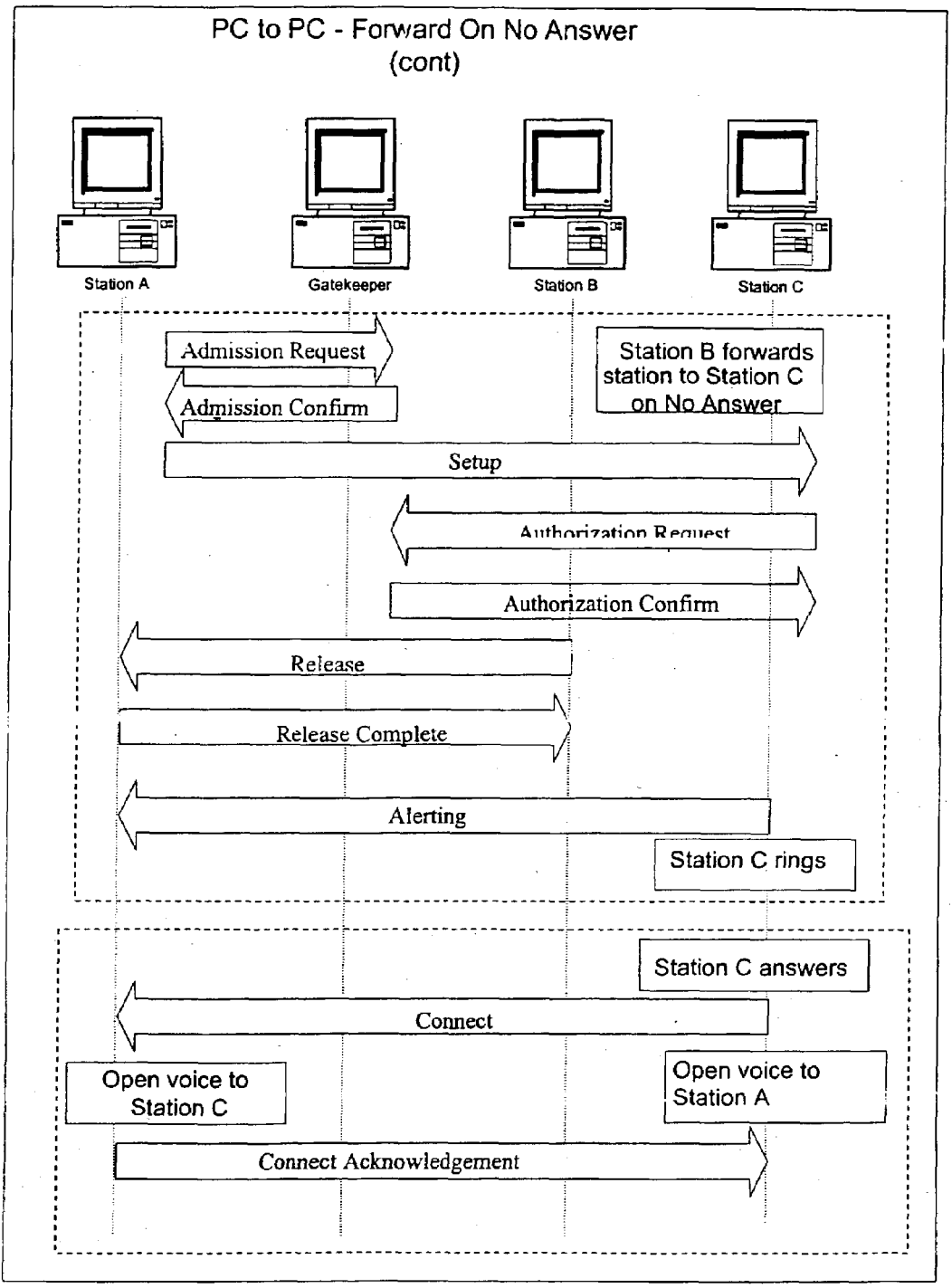

FIGS. 28a and 28b illustrate the case in which Station B does not answer, and forwards calls to Station C. Station A dials Station B's ZeroPlus number. The ZeroPlus application sends an Admission Request containing the calling number (Station A) and the called number (Station B) to the Gatekeeper. The Gatekeeper responds with an Admission Confirm containing IP Addresses which route to Station B. Since Station B is in forward mode, the Admission Confirm message also contains forwarding information (forwarded on no answer to Station C).

Station A's ZeroPlus application sends a Setup message to Station B. Station B is currently not on a call. Upon receiving Station A's Setup message, Station B sends an Authorization Request to the Gatekeeper, which responds with an Authorization Confirm to Station B. Since Station B is available to accept this call, it sends Station A an Alerting message and begins to ring. Upon receiving the Alerting message from Station B, Station A emits a ringback sound. After five rings, since Station A has received information to forward calls on no answer, to Station C. Therefore, Station A stops ringing and sends a Disconnect message to Station B to begin disconnecting the call. Station A also sends an End-of-Call and an Admission Request message to the Gatekeeper.

To complete disconnecting the call between stations A and B, in response to Station A's Disconnect message, Station B sends a Release message and also stops ringing. When Station A receives Station B's Release message, it responds by sending a Release Complete message to Station B, which completes disconnecting the call from Station A's perspective. Receiving Station A's Release Complete message completes disconnecting the call from Station B's perspective.

The Gatekeeper responds with an Admission Confirm message to Station A. When Station A receives the Admission Confirm message from the Gatekeeper, it sends a Setup message to Station C. When Station C receives the Setup message, it sends an Authorization Request to the Gatekeeper, which responds with an Authorization Confirm to Station C. Since Station C is available to accept the call, it then responds to Station A's Setup message with an Alerting message and begins to ring. When it receives the Alerting message from Station C, Station A commences ring back. When Station C answers the call, it sends a Connect message to Station A and opens a voice channel from Station C to Station A. When Station A receives the Connect message from Station C, it responds with a Connect Acknowledgement and opens a voice channel from Station A to Station C.

PC to PC—Forward on No Response

Figure 29:
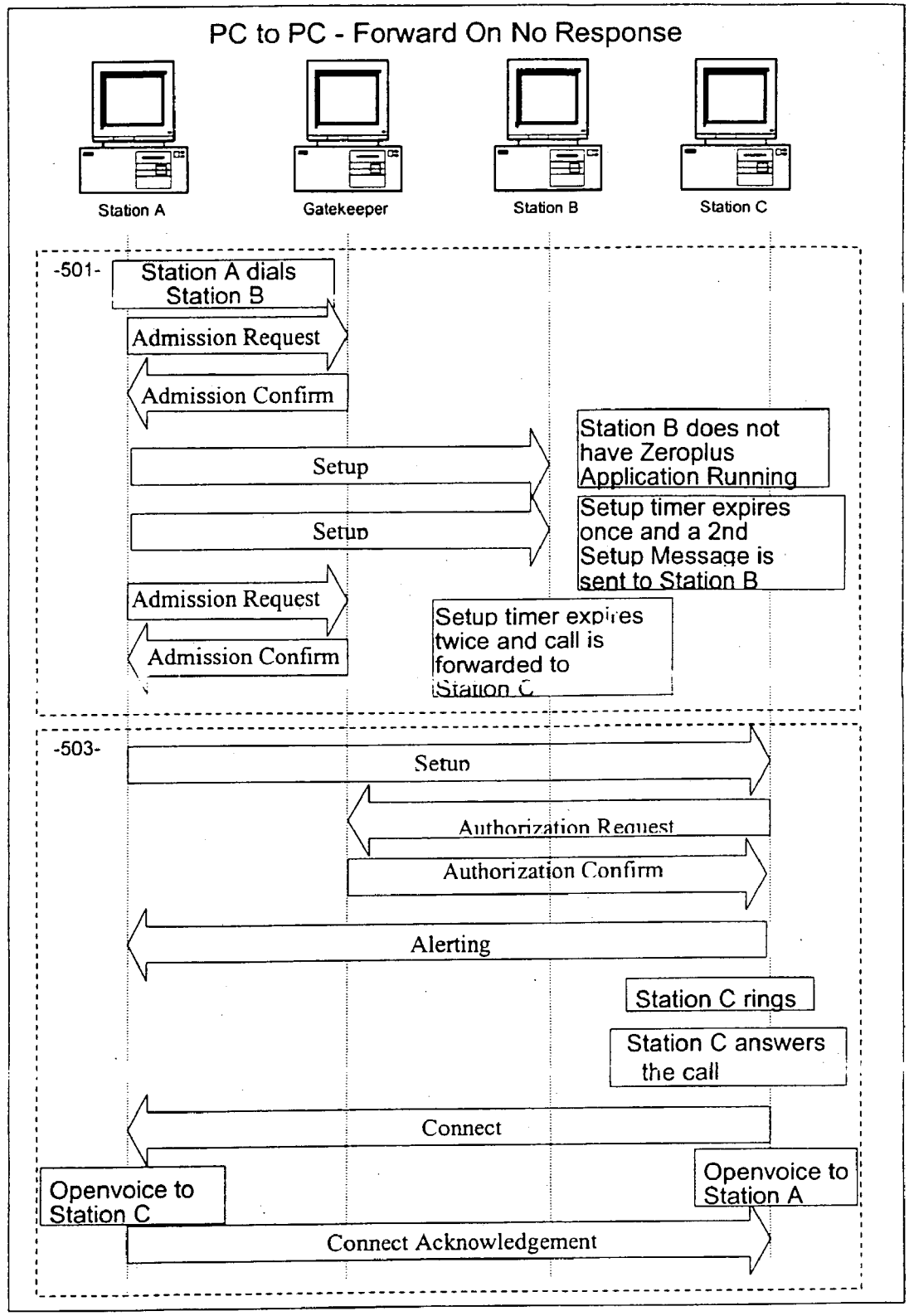
FIG. 29 is a diagram of activities associated with a forward on no-response PC-to-PC call.

FIG. 29 illustrates the case in which on no response, Station B forwards calls to its station to Station C. Station A dials Station B's ZeroPlus number. The ZeroPlus application sends an Admission Request containing the calling number (Station A) and the called number (Station B) to the Gatekeeper. The Gatekeeper responds with an Admission Confirm containing IP Addresses which route to Station B. Since Station B is forwarded, the Admission Confirm message also contains forwarding information (forwarded on no response to Station C).

Station A's ZeroPlus application sends a Setup message to Station B. Station B is currently not logged into ZeroPlus. After three seconds, Station A resends the Setup message to Station B. After another three seconds, Station A's ZeroPlus application determines that there is no response from Station B. Since Station A has forwarding on no response information for Station B, it sends another Admission Request to the Gatekeeper.

The Gatekeeper responds with an Admission Confirm message to Station A. When Station A receives the Admission Confirm message, it sends a Setup message to Station C. When Station C receives the Setup message, it sends an Authorization Request to the Gatekeeper, which responds with an Authorization Confirm to Station C. Since it is available to accept the call, Station C then responds to Station A's Setup message with an Alerting message and begins to ring. When it receives the Alerting message from Station C, Station A commences ringback. When Station C answers the call, it sends a Connect message to Station A and opens a voice channel from Station C to Station A. When Station A receives the Connect message from Station C, it responds with a Connect Acknowledgement and opens a voice channel from Station A to Station C.

PC to PC—Call-Waiting

Figure 30A:
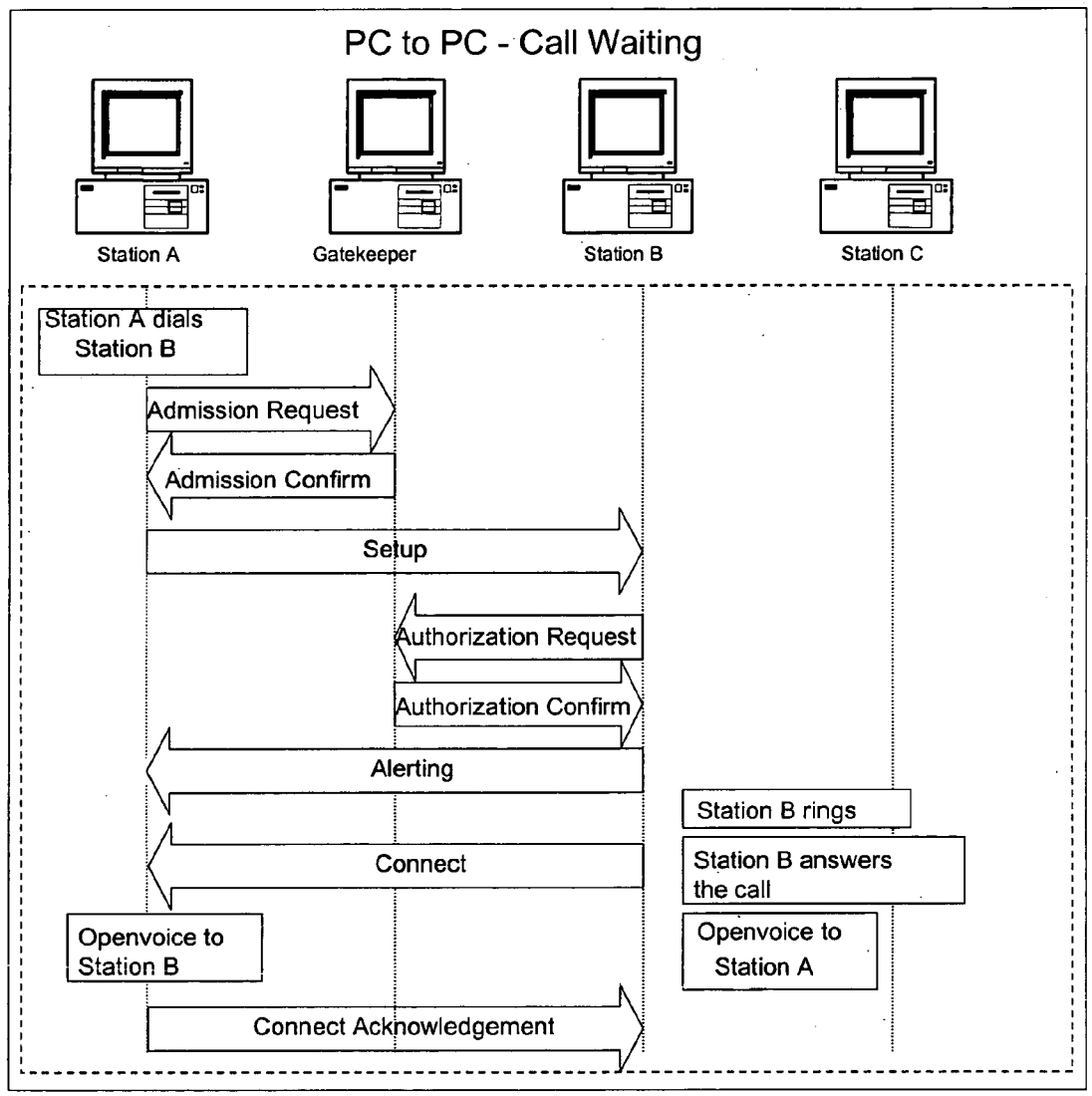
FIGS. 30a and 30b are a diagram of activities associated with call waiting during a PC-to-PC call.
Figure 30B:
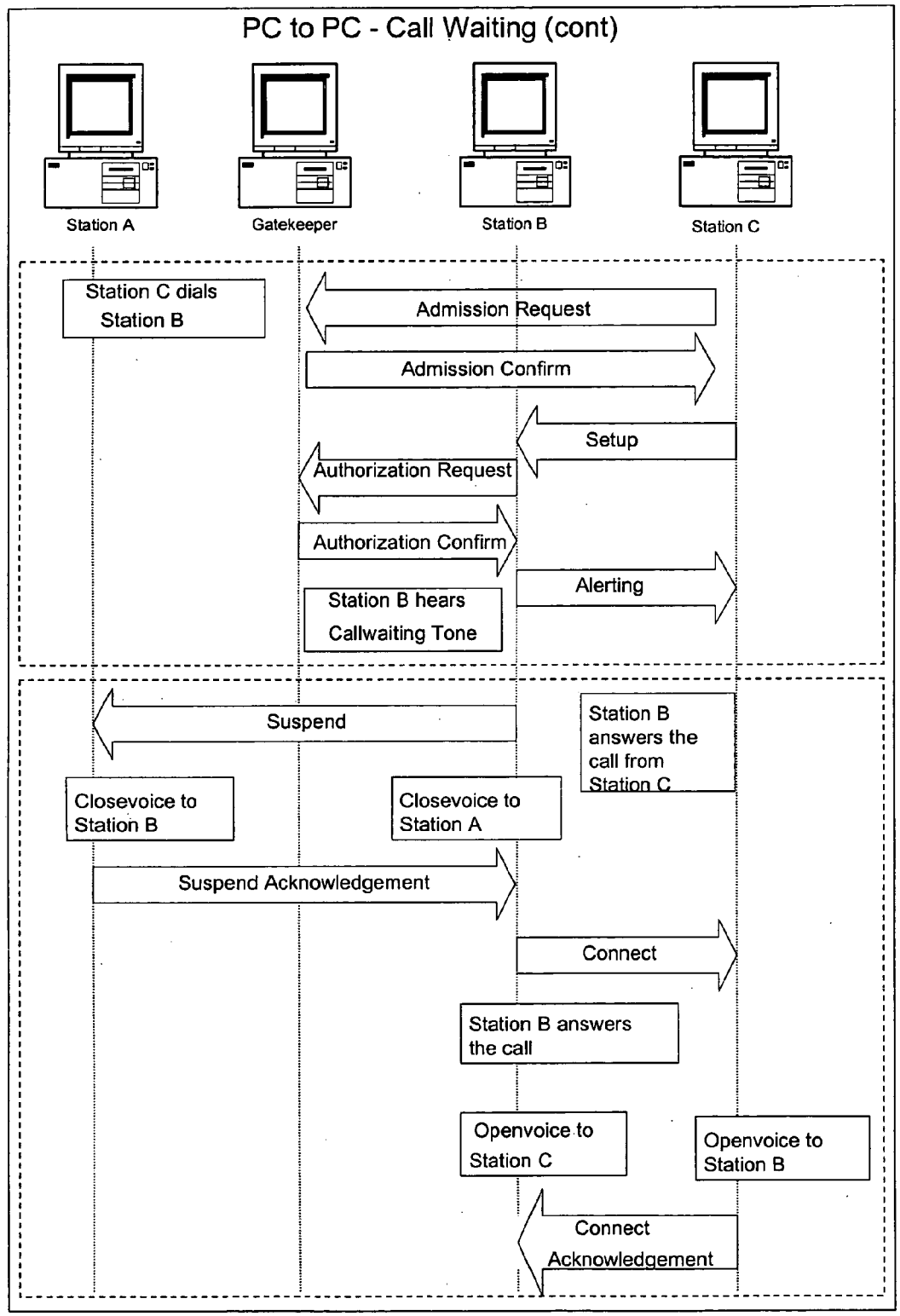

FIGS. 30a and 30b illustrate the case in which Station B has the call-waiting feature enabled, is talking to Station A, and receives an incoming call from Station C. Station A dials Station B's ZeroPlus number. The ZeroPlus application sends an Admission Request containing the calling number (Station A) and the called number (Station B) to the Gatekeeper. The Gatekeeper responds to Station A with an Admission Confirm message containing IP Addresses which route to Station B. When Station A receives the Admission Confirm message, it sends a Setup message to Station B.

Since Station B is currently not on a call, when it receives the Setup message from Station A it sends an Authorization Request to the Gatekeeper, which responds with an Authorization Confirm to Station B. Since it is available to accept the call, Station B then responds to Station A's Setup message with an Alerting message and begins to ring. When it receives the Alerting message from Station B, Station A commences ringback. When Station B answers the call, it sends a Connect message to Station A and opens a voice channel from Station B to Station A. When Station A receives the Connect message from Station B, it responds with a Connect Acknowledgement and opens a voice channel from Station A to Station B.

While Station A and Station B are conducting their call, Station C dials Station B's ZeroPlus number. The Station C ZeroPlus application sends an Admission Request containing the calling number (Station C) and the called number (Station B) to the Gatekeeper. The Gatekeeper responds to Station C with an Admission Confirm message containing IP Addresses which route to Station B. When Station C receives the Admission Confirm message, it sends a Setup message to Station B.

Station B is currently on a call with Station A. Since Station B has the call-waiting feature enabled, when it receives the Setup message from Station C, Station B sends an Authorization Request to the Gatekeeper. The Gatekeeper responds with an Authorization Confirm to Station B. Since it is available to accept the call, Station B then responds to Station C's Setup message with an Alerting message. At this time, Station B hears the call-waiting tone. When it receives the Alerting message from Station B, Station C begins ringback.

Station B clicks on the GUI Flash button to answer the call from Station C. Upon receiving the Suspend message from Station B, Station A closes the voice channel from itself to Station B and responds with a Suspend Acknowledgement message. Upon receiving the Connect message from Station B, Station C opens a voice channel from itself to Station B and responds with a Connect Acknowledgement message to Station B, thus answering the new call.

PC to PC—Blind Transfer

Figure 31A:
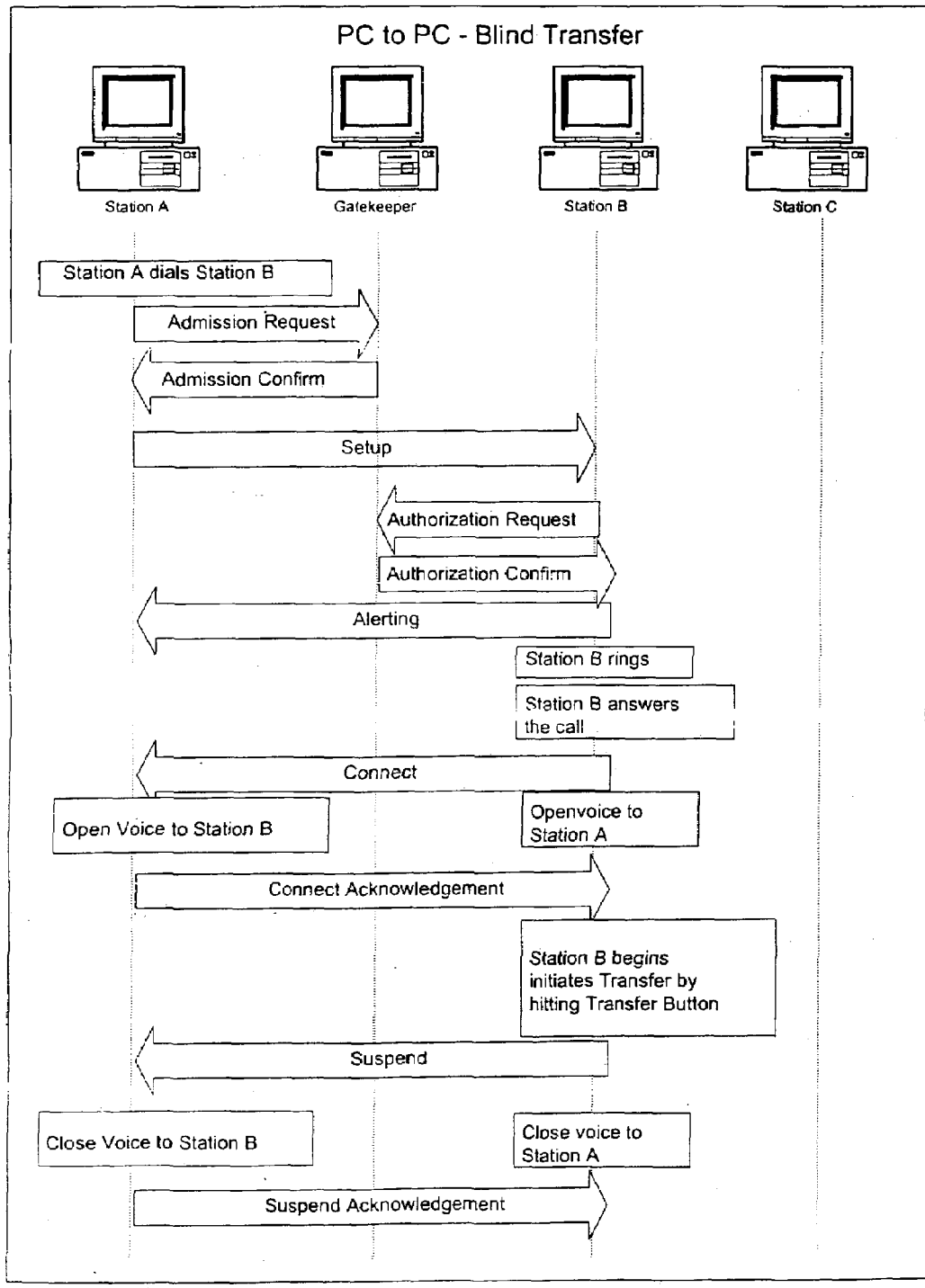
FIGS. 31a, 31b and 31c are a diagram of activities associated with a blind transfer during a PC-to-PC call.
Figure 31B:
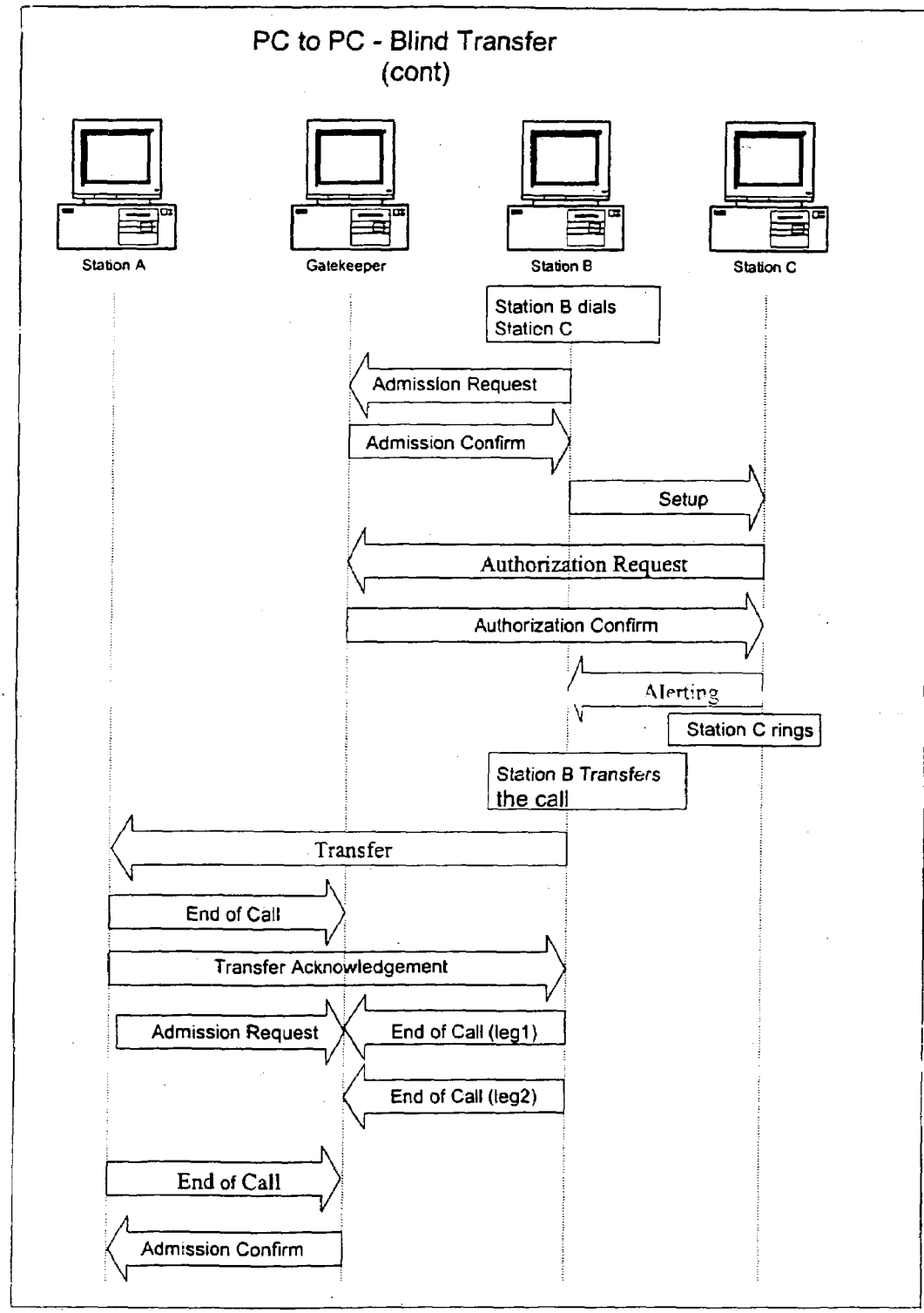
Figure 31C:
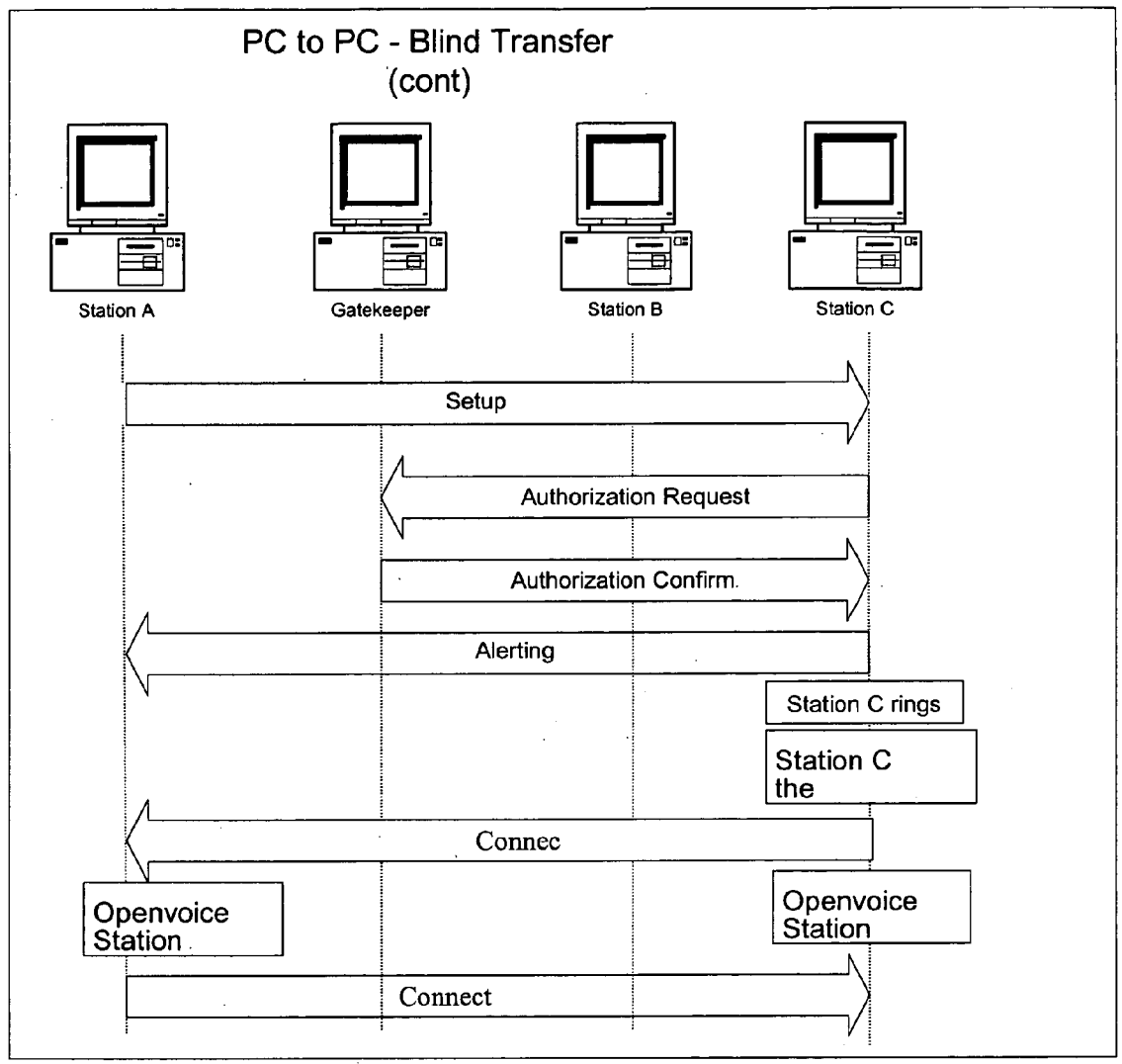

FIGS. 31a, 31b and 31c illustrate the case in which Station B has the transfer feature enabled.

Station A dials Station B's ZeroPlus number. The Station A ZeroPlus application sends an Admission Request containing the calling number (Station A) and the called number (Station B) to the Gatekeeper. The Gatekeeper responds to Station A with an Admission Confirm message containing IP Addresses which route the call to Station B. When Station A receives the Admission Confirm message from the Gatekeeper, it sends a Setup message to Station B. Since Station B is currently not on a call, when it receives the Setup message from Station A it sends an Authorization Request to the Gatekeeper. The Gatekeeper responds to Station B with an Authorization Confirm. Since it is available to accept the call, Station B then responds to Station A's Setup message with an Alerting message and begins to ring. When it receives the Alerting message from Station B, Station A begins to ringback. When Station B answers the call, it sends a Connect message to Station A and opens a voice channel from Station B to Station A. When Station A receives the Connect message from Station B, it responds with a Connect Acknowledgement and opens a voice channel from Station A to Station B.

Next, the Station A user verbally requests to be transferred to Station C. The Station B user clicks on the Transfer button. This event sends a Suspend message to Station A and closes the voice channel from Station B to Station A. Upon receiving the Suspend message from Station B, Station A closes the voice channel from itself to Station B and responds with a Suspend Acknowledgement. Station B acknowledges receipt of the Suspend Acknowledgement message from Station A. Clicking the GUI Transfer button at Station B also initiates dialing the second leg of the transfer. The GUI prompts the Station B user to enter a number to dial. Station B then enters Station C's ZeroPlus number and clicks on the Dial button, which initiates Station B transferring to Station C.

Station B's ZeroPlus application sends an Admission Request containing the calling number (Station B) and the called number (Station C) to the Gatekeeper. The Gatekeeper responds to Station B with an Admission Confirm message containing IP Addresses which route to Station C. When Station B receives the Admission Confirm message, it sends a Setup message to Station C. Since Station C is currently not on a call when it receives the Setup message, it sends an Authorization Request to the Gatekeeper, which responds with an Authorization Confirm to Station C. Since it is available to accept the call, Station C then responds to Station B's Setup message with an Alerting message and begins to ring. When it receives the Alerting message from Station C, Station B begins ringback.

Station B completes the blind transfer by clicking the Transfer button before Station C has answered. Station B sends a Transfer message containing Station C's number to Station A. Upon receiving the Transfer message from Station B, Station A does the following: responds to Station B with a Transfer Acknowledgement message, and sends the Gatekeeper an End of Call and an Admission Request message. When Station B receives the Transfer Acknowledgement message, it sends an End Of Call message to the Gatekeeper for each of the transfer legs. Station B has completed its part of the transfer.

The Gatekeeper sends to Station A an Admission Confirm message containing IP Addresses which route to Station C. When Station A receives the Admission Confirm message, it sends a Setup message to Station C. When it receives the Setup message from Station A, Station C sends an Authorization Request to the Gatekeeper. The Gatekeeper responds to Station C with an Authorization Confirm. Station C determines that the Setup message from Station A is due to a transfer, then, since it is available to accept the call, responds to Station A's Setup message with an Alerting message and continues to ring. When it receives the Alerting message from Station C, Station B begins to ring. When Station C answers the call, a Connect message is sent to Station A and a voice channel is opened from Station B to Station A. When Station A receives the Connect message from Station B, it responds to the Connect message with a Connect Acknowledgement and opens a voice channel from Station A to Station B.

PC to PC—Consultative Transfer

Figure 32A:
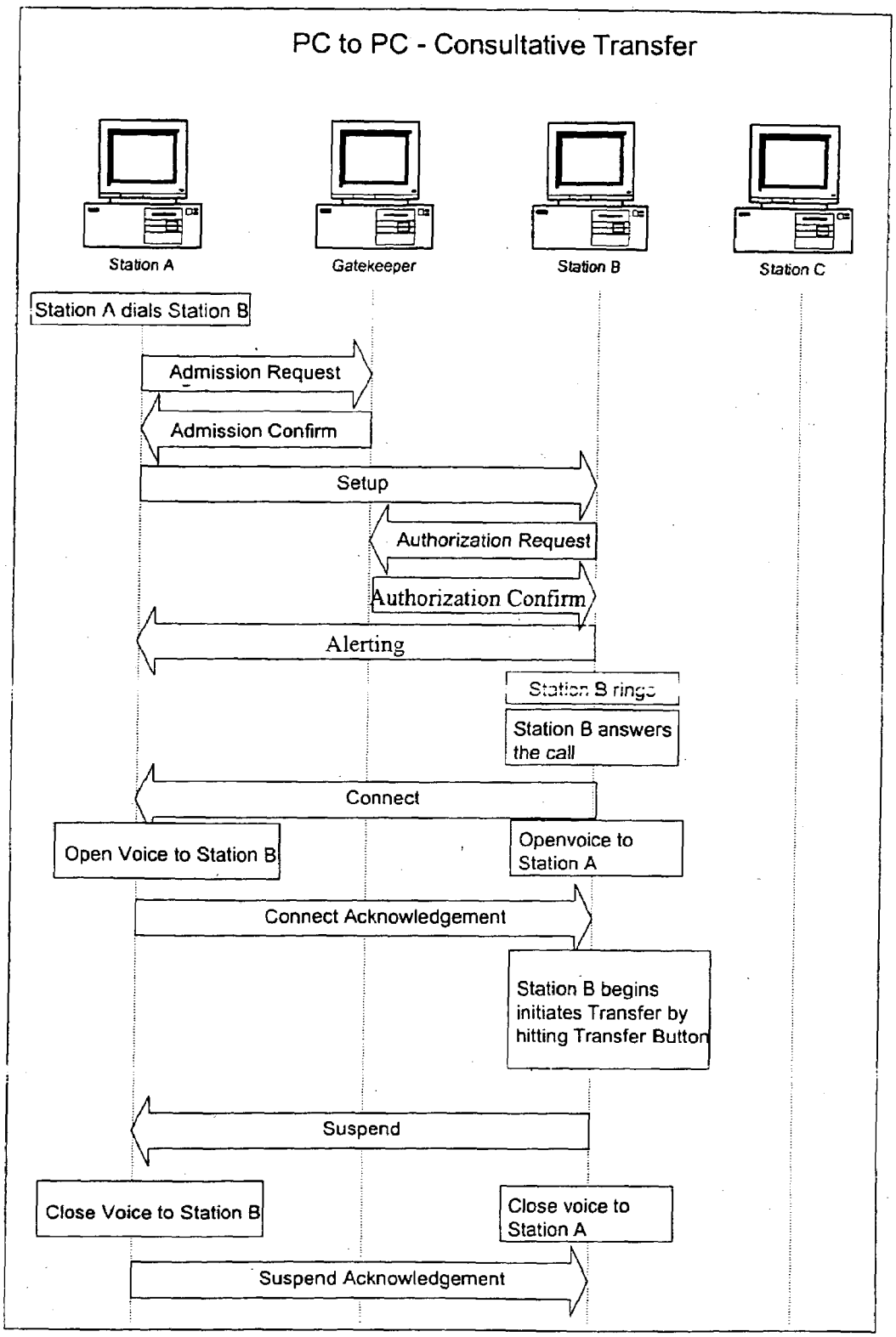
FIGS. 32a, 32b and 32c are a diagram of activities associated with a consultative transfer during a PC-to-PC call.
Figure 32B:
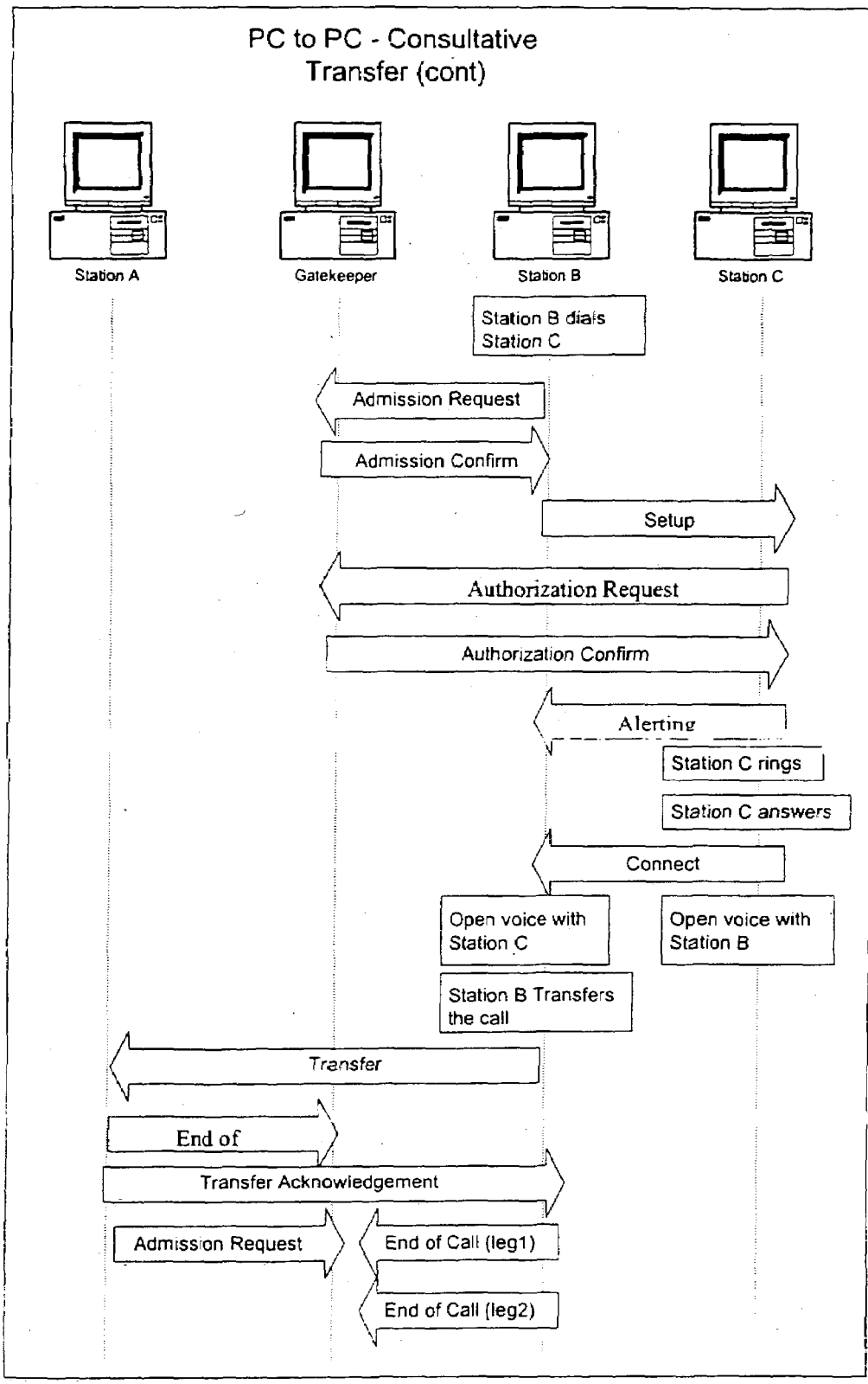
Figure 32C:
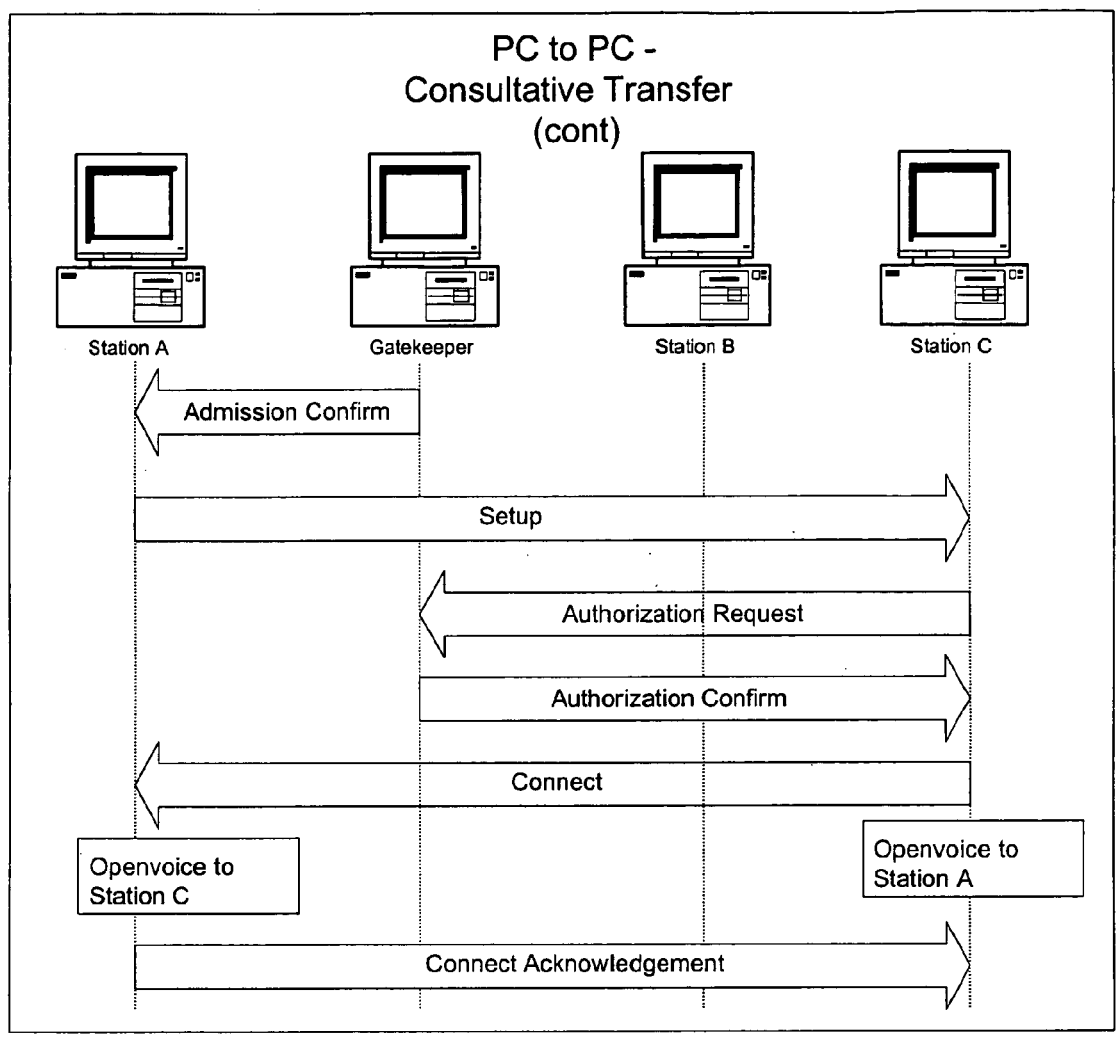
Figure 33:
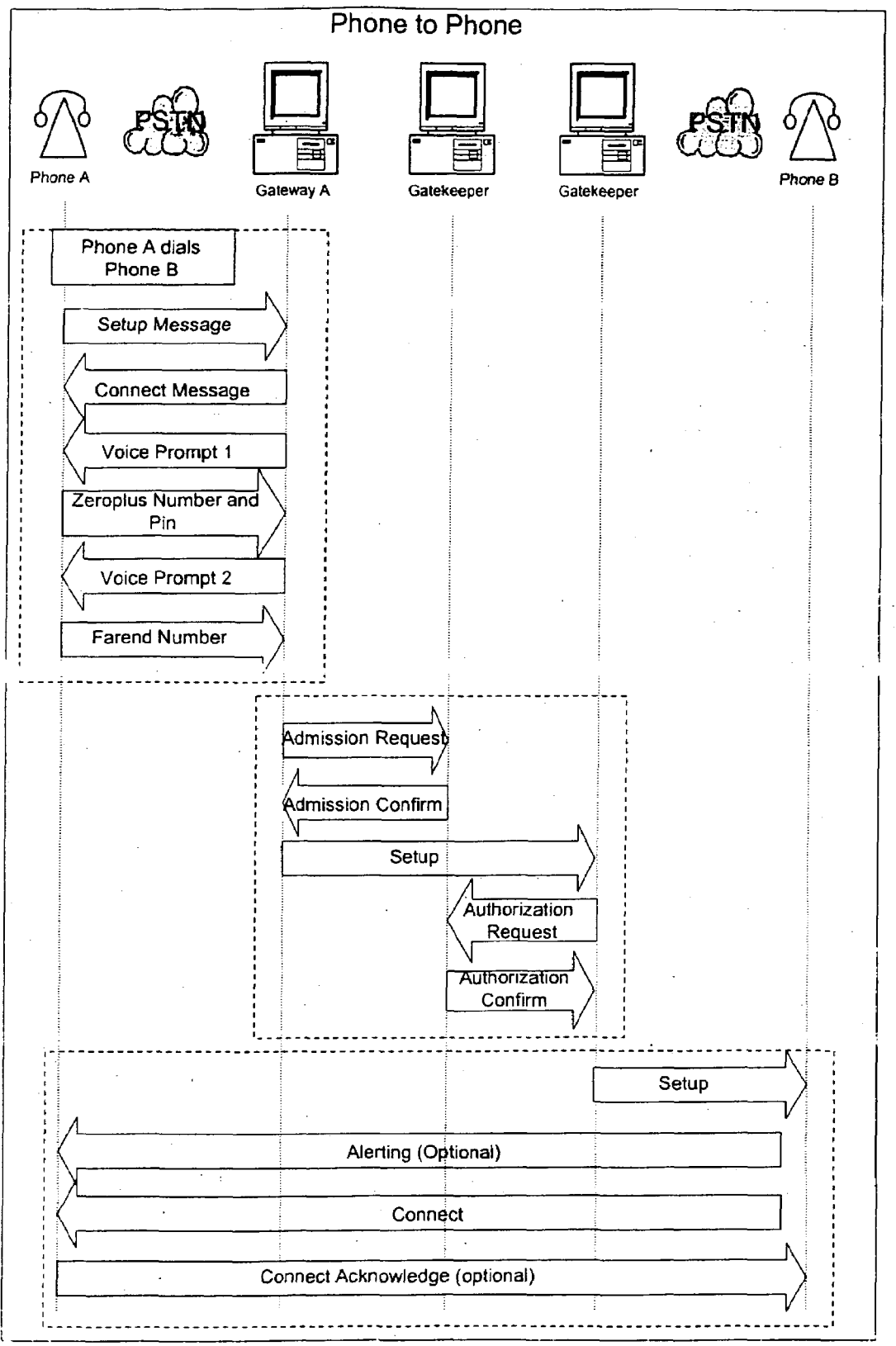
FIG. 33 is a diagram of activities associated with a telephone-to-telephone call.

FIGS. 32a, 32b and 32c illustrate the case in which Station B has the transfer feature enabled. Station A dials Station B's ZeroPlus number. The Station A ZeroPlus application sends an Admission Request containing the calling number (Station A) and the called number (Station B) to the Gatekeeper. The Gatekeeper responds to Station A with an Admission Confirm message containing IP Addresses which route to Station B. When Station A receives the Admission Confirm message, it sends a Setup message to Station B. Since Station B is currently not on a call, when it receives the Setup message from Station A it sends an Authorization Request to the Gatekeeper. The Gatekeeper responds with an Authorization Confirm to Station B. Since it is available to accept the call, Station B then responds to Station A's Setup message with an Alerting message and begins to ring. When it receives the Alerting message from Station B, Station A begins ringback. When Station B answers the call, it sends a Connect message to Station A and opens a voice channel from Station B to Station A. When Station A receives the Connect message from Station B, it responds to the Connect message with a Connect Acknowledgement and opens a voice channel from Station A to Station B.

Next, Station A verbally requests to be transferred to Station C. Station B clicks on the Transfer button, which sends a Suspend message to Station A and closes the voice channel from Station B to Station A. Upon receiving the Suspend message from Station B, Station A closes the voice channel from itself to Station B and responds with a Suspend Acknowledgement. Station B acknowledges the receipt of the Suspend Acknowledgement message from Station A. Clicking the Station B's Transfer button also initiates dialing the second leg of the transfer. The GUI prompts the Station B user to enter a number to dial. The Station B user then enters Station C's ZeroPlus number and clicks on the Dial button, which initiates Station B dialing Station C.

Station B's ZeroPlus application sends an Admission Request containing the calling number (Station B) and the called number (Station C) to the Gatekeeper. The Gatekeeper responds to Station B with an Admission Confirm message containing IP Addresses which routes to Station C. When Station B receives the Admission Confirm message from the Gatekeeper, it sends a Setup message to Station C. Since Station C is currently not on a call when it receives the Setup message from Station B, it sends an Authorization Request to the Gatekeeper. The Gatekeeper responds with an Authorization Confirm to Station C. Since it is available to accept the call, Station C then responds to Station B's Setup message with an Alerting message and begins to ring. When it receives the Alerting message from Station C, Station B begins ringback. When Station C answers the call, it sends a Connect message to Station B and opens a voice channel from Station B to Station C. When Station B receives the Connect message from Station C, it responds with a Connect Acknowledgement and opens a voice channel from Station C to Station A.

After Station C has answered, the Station B user completes the consultative transfer by clicking the Transfer button. Station B sends a Transfer message containing Station C's number to Station A. Upon receiving the Transfer message, Station A does the following: responds with a Transfer Acknowledgement message to Station B, and sends the Gatekeeper an End of Call and an Admission Request message. When Station B receives the Transfer Acknowledgement message, it sends an End Of Call message to the Gatekeeper for each of the transfer legs. Station B has completed its part of the transfer.

Next, the Gatekeeper sends to Station A an Admission Confirm message containing IP Addresses which route to Station C. When Station A receives the Admission Confirm message, it sends a Setup message to Station C. When it receives the Setup message Station C sends an Authorization Request to the Gatekeeper, which responds with an Authorization Confirm to Station C. Station C determines that the Setup message from Station A is due to a transfer and then, since it is available to accept the call, responds to Station A's Setup message with a Connect message. Station C closes the voice channel from itself to Station B and reopens a voice channel from itself to Station A. When Station A receives the Connect message from Station C, it sends a Connect Acknowledgement to Station C and opens a voice channel from itself to Station C.

Calls Via Internet Involving Conventional Telephones

The system also manages calls to or from conventional telephones. The gateway gatekeeper and gateway seamlessly bridge calls from the Internet destined to the PSTN and calls from the PSTN to the Internet, or PSTN to PSTN via Internet. When a call goes from PSTN to PSTN, the gateway responsible for the specific area and city code at the point of origin handles that portion of the call, and a gateway responsible for the destination area and city code handles the termination side of the call. Each side of the call is treated as a separate call which is bridged together over Internet or other data network that both gateways have in common.

Note that a gatekeeper also includes a gateway, in addition to its call management functions. The gateway also is used for the PSTN side of a PC-to-telephone and a telephone-to-PC call. Whenever the PSTN or another switch, PBX, IVR or other call center device is utilized in the origination and/or the termination of a call, a gateway must also be used at any point where traditional telecommunication technology is involved.

For phone-to-phone calls, neither party uses a PC. Both sides are handled by gateways as previously explained. For PC-to-phone or phone-to-PC calls, ZeroPlus software is required only on the PC side of the call, and a gateway will handle the other side of the call. PC-to-PC calls require that both parties have ZeroPlus software.

The gatekeeper determines which is the "best way" to route calls. The gatekeeper has routing tables much like those in traditional telecommunications switches. These routing tables are addressed any time a calling party addresses a call request to the gatekeeper. There are two completely different routing methodologies. One is for on-net calls (i.e. calls originating from and terminating at ZeroPlus clients on the Internet). The second is a more sophisticated routing methodology for calls originating on the Internet and terminating off-net, i.e. calls where the calling party is connected via the Internet and the called party is reached via a one ("1") plus termination through a gateway to the PSTN. In this situation the gatekeeper routing tables determine the least cost route to terminate the call.

The "best way" is a combination of the least cost route and available resources. In the event that all resources are available (i.e. all gateways for termination of off-net traffic in all cities still have ports available to handle the call), the default route will be the least cost one. For example, if a call is destined for area code 512 (Austin, Tex.) and there is a gateway on the network that provides local service in Austin, the least cost route would terminate the call in Austin without applying any long distance leg. But, if the Austin gateway were to have all ports busy at the time of the call attempt, it would be necessary to terminate the call through another gateway on the network. In this case a routing table would route the call anywhere except Texas due to the large premium on calls that originate and terminate in Texas. It actually costs less to terminate a call in Oklahoma and pay a discount long distance rate to back haul the call to Texas.

The programming of the routing tables emulates that which is standard and ordinary in the telecommunications industry today. Programming the routing tables does not require a programmer, only an administrator who minimizes costs associated with calls destined for different areas of the country.

The gatekeeper database has routing information and tables of data related to the IP addresses. The gatekeeper determines the IP addresses of any device addressed by the service. In the case of the end-user, once data connectivity has been established, it allows the computer to be assigned an IP address by the Internet Service Provider (ISP), and the user launches the ZeroPlus Application. When the application starts up it opens a dialog box and requires the user to input his or her ten digit ZeroPlus number and the associated four digit PIN. After the user enters the appropriate information into the dialog box and clicks the OK button, the application sends to the gatekeeper a validation request containing the ZeroPlus number, PIN, and current IP address of the station. The gatekeeper looks up the ZeroPlus number in the database and verifies that both the PIN and the ZeroPlus number are correct, sends a validation accepted message to the ZeroPlus application and updates the user's account with the current IP address. The gatekeeper also sends back information associated with the current features (i.e. call forwarding, call waiting, three way calling, call transfer, voice mail) to which the member has access. For example, if the member has "call forward set on no answer" assigned to his/her office ZeroPlus telephone number, the ZeroPlus telephone number of that ZeroPlus station will be passed back to the application. If the user has call transfer, three-way calling, and call waiting capability, the gatekeeper will include information in the message to the application notifying it to accept requests for these features. If the member has subscribed to voice mail, the IP address of the voice mail server or its "phone number" will be passed to the application. Upon receipt of a confirmation, the end station will commence sending "heartbeat" messages to the gatekeeper so that the gatekeeper will know that the station is still "logged on."

Traditional telephone network users are restricted to telephone devices which are physically connected to a set of wires within a fixed structure, such as a home. With portable telephones such as cellular phones, the equipment is mobile but the telephone number is not. Mobile cellular telephone numbers are device-specific to a particular cell telephone. Cell telephone users lose number portability because they have to use a specific cell telephone registered for that telephone number. The ZeroPlus architecture provides a device-independent telephone number access strategy. This enables mobile users to use their portable telephone number during travel without necessarily taking their physical portable telephone with them. ZeroPlus users with at least 28.8 Kbps access to a digital data network and a computer with the ZeroPlus GUI have access to all incoming calls and are able to make outgoing calls on their current ZeroPlus account. Members may use ZeroPlus with telephones when they do not have access to their computer. Inbound calls placed to the user computer are not forwarded to conventional telephones unless they subscribe to and use the call forward-feature of the service to forward their ZeroPlus calls to an off-net telephone number. To originate ZeroPlus calls without access to their computers, members dial a PSTN access number and follow the instructions to connect either on-net or off-net calls. Billable calls are posted to their ZeroPlus accounts.

Traditional telephone network users have grown accustomed to a variety of add-on features and up-grades available on the PSTN. The ZeroPlus system, through its robust combination of technology, hardware, software and connectivity to the PSTN, also makes a large suite of features available to users. Upgrades (for an added fee) include call forwarding, call waiting, call transfer, caller ID, "follow me" service, voice mail and conference calls, as described previously.

The ZeroPlus plan also provides connection shortcuts to frequently called numbers. The list is called the "ZP Pals" list. Once the gatekeeper has sent the validation acceptance message, it can access what ZeroPlus users this member has in his/her ZP Pals list and what ZP Pals have this member in their list. It sends a message to the "logging in" station containing the ZP Pals list, what the IP address is for each of the "pals" that are online, and what members are interested in the online status of this station. An exception to this is that the Gatekeeper will not return IP addresses for members if "Call Blocking" applies. This feature prevents other users from determining online status or placing calls to the blocked ZeroPlus number. The end station will then display the ZP Pals who have gatekeeper-supplied current IP addresses with the "online indicator" and send each of them, along with the members having this user in their ZP Pals list, a message telling them the member is online. ZP Pals on the list without an IP address will be displayed with the "offline indicator." The end station will notify all "interested parties" when it is shutting down so that the other stations will know to update the status for the user on this station to "offline." In the event that the gatekeeper fails to receive a "heartbeat" from a station it believes to be online, it will send all interested parties notification that the station is "offline," update the status it has on that station to reflect the fact that it is offline, and close out any calls that might be active for that station. This is to address the problem that computers do "crash" occasionally or lose Internet connectivity. It is not sufficient to rely on a "clean" shutdown for the end stations.

ZeroPlus provides phone number location independence. The ZeroPlus number and PIN code as well as the ZP-Pals list, feature set, and possible affiliate partner logos are all location independent. For example, if a member signs in through an affiliate partner such as Talk City and has a home telephone number which is "1 301 555 1212," the corresponding ZeroPlus number "0 301 555 1212" will be assigned to their home computer. Upon logging onto ZeroPlus, the gatekeeper checks and validates the account and then notifies the ZeroPlus application of all of the services that the user has available. The application would also be provided with the user's ZP-Pals list, and the current status (i.e. on-line or off-line) of each of those individuals. If a ZeroPlus member is visiting a family which has a multimedia computer but is not a ZeroPlus member and does not have the application resident on their hard drive, then the only thing that the member would have to do would be to download the application and log in using his/her ZeroPlus number and PIN. Once the user logs into that computer, all normal ZeroPlus capabilities would be available at that computer. The ZeroPlus number and all associated account features are completely portable and hardware independent. While traditional home telephone numbers require a fixed port on a switch, or the number has to be forwarded to another fixed port on a switch. ZeroPlus numbers are completely hardware and port independent. The numbers are routed, not switched.

What has been described is a private dialing plan wherein conventional telephone numbers are used as the basis for creating caller access numbers and the number dialed to reach the recipient. Although described with respect to a particular exemplary embodiment, principles of the invention may be exploited in other dialing systems and telephonic communication methods. Accordingly, the embodiments described herein should be regarded as merely illustrative of the invention and should not be construed as limiting the scope of the invention.

What is claimed is:

1. A method comprising a private dialing plan for communication of packetized voice on a packet-based network involving at least one network gateway, wherein:
   a caller's on-network access to a gateway is accomplished, at least in part, using a multi-part access sequence consisting of a leading "0", followed by the caller's conventional telephone number or other telephone number registered with the plan, followed, at least in part, by a multiple digit user personal identification number;
   off-network access to the plan is provided at least in part through telephone dial-up access to a gateway using a public telephone switching system;
   a call to on-network Internet Protocol (IP) addresses is placed by dialing or keying a sequence consisting of a leading "0", followed by a telephone number registered with the plan corresponding to the IP address; and
   a call to an off-net conventional telephone is placed by dialing a "1", followed by a telephone number corresponding to the off-net telephone,
   wherein at least one call originates on the Internet and terminates off-net, and wherein routing tables determine a least cost route to terminate the call.

2. The method of claim 1 wherein a Q.931 signaling protocol is used to establish, maintain and release switched connections over the network.

3. The method of claim 1 wherein database search keys based, at least in part, on member registered conventional telephone numbers are used to access various plan database information, such as the IP address corresponding with the called number and any optional services or features available for that member.

4. The method of claim 1 wherein a gatekeeper determines which is the optimum way to route on-net calls.

5. The method of claim 1 wherein optional services available for PC-to-PC calls are selected from the group of services comprising:
   forward unconditional;
   forward on busy;
   forward on no answer;
   forward on no response;
   call waiting;
   blind transfer; and
   consultative transfer.

6. A method comprising a private dialing plan for communication of packetized voice on a packet-based network involving at least one network gateway, wherein:
   on-network access to a gateway is accomplished, at least in part, using a multi-part access sequence consisting of a leading "0", followed by the caller's conventional telephone number or other telephone number registered with the plan, followed, at least in part, by a multiple digit user personal identification number,
   off-network access to the plan is provided at least in part through telephone dial-up access to a gateway using a public telephone switching system;
   calls to on-network Internet Protocol (IP) addresses are accomplished, at least in part, using a sequence consisting of a leading "0", followed by a telephone number registered with the plan corresponding to the IP address; and
   calls to off-net conventional telephones are accomplished, at least in part, by dialing a "1", followed by a telephone number corresponding to the off-net telephone to be called,
   wherein optional services available for PC-to-PC calls are selected from the group of services comprising:
   forward unconditional; forward on busy; forward on no answer; forward on no response; call waiting; blind transfer; and consultative transfer.

7. The method of claim 6 wherein a Q.931 signaling protocol is used to establish, maintain and release switched connections over the network.

8. The method of claim 6 wherein database search keys based, at least in part, on member registered conventional telephone numbers are used to access various plan database information, such as the IP address corresponding with the called number and any optional services or features available for that member.

9. The method of claim 7 wherein a gatekeeper determines which is the optimum way to route on-net calls.

10. The method of claim 6 wherein calls originate on the Internet and terminate off-net, and gatekeeper routing tables determine a least cost route to terminate the call.

11. A method, in a system comprising a private dialing plan for communication of packetized voice on a packet-based network involving at least one network gateway, the method comprising:
   obtaining on-network access to a gateway using a multi-part access sequence consisting of a leading "0", followed by a conventional telephone number or another telephone number registered with the plan, followed, at least in part, by a multiple digit user personal identification number;
   calling an off-net conventional telephone by dialing a "1", followed by a telephone number corresponding to the off-net conventional telephone,
   wherein routing tables determine a least cost route to terminate the call.

12. A method as in claim 11 wherein optional services available for PC-to-PC calls are selected from the group of services comprising:
   forward unconditional; forward on busy; forward on no answer; forward on no response; call waiting; blind transfer; and consultative transfer.

13. The method of claim 11 wherein a Q.931 signaling protocol is used to establish, maintain and release switched connections over the network.

* * * * *